(12) United States Patent
Iwanabe

(10) Patent No.: US 8,619,511 B1
(45) Date of Patent: Dec. 31, 2013

(54) HEAT-ASSISTED MAGNETIC RECORDING HEAD WITH OPTICAL SPOT-SIZE CONVERTER FABRICATED IN 2-DIMENSIONAL WAVEGUIDE

(75) Inventor: Yasuhiko Iwanabe, Tokyo (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/568,001

(22) Filed: Aug. 6, 2012

(51) Int. Cl.
*G11B 11/00* (2006.01)
(52) U.S. Cl.
USPC ............... 369/13.24; 369/13.13; 385/43
(58) Field of Classification Search
USPC ............. 369/13.02, 13.13, 13.24; 360/59; 385/43
See application file for complete search history.

(56) References Cited

U.S. PATENT DOCUMENTS

| | | | |
|---|---|---|---|
| 7,027,700 | B2 | 4/2006 | Challener |
| 7,069,568 | B2 | 6/2006 | Coehoorn et al. |
| 7,239,599 | B2 | 7/2007 | Tawa et al. |
| 7,359,599 | B2 | 4/2008 | Matsumoto |
| 7,596,295 | B2 | 9/2009 | Hasegawa |
| 7,664,352 | B1 * | 2/2010 | Okayama ............ 385/43 |
| 7,755,978 | B2 | 7/2010 | Nishida et al. |
| 8,098,547 | B2 * | 1/2012 | Komura et al. ......... 369/13.33 |
| 2002/0141682 | A1 * | 10/2002 | Ryu et al. ............. 385/14 |
| 2006/0204175 | A1 * | 9/2006 | Laurent-Lund et al. ....... 385/43 |
| 2007/0230323 | A1 * | 10/2007 | Nishida et al. ........ 369/275.4 |
| 2009/0303858 | A1 | 12/2009 | Kuiseko et al. |
| 2010/0054663 | A1 * | 3/2010 | Okayama ............ 385/43 |
| 2010/0074063 | A1 | 3/2010 | Peng et al. |
| 2011/0090770 | A1 * | 4/2011 | Iwanabe et al. ........ 369/13.24 |
| 2011/0182549 | A1 * | 7/2011 | Okayama ............ 385/43 |
| 2011/0205660 | A1 * | 8/2011 | Komura et al. ............ 360/59 |

FOREIGN PATENT DOCUMENTS

| | | | | |
|---|---|---|---|---|
| JP | 07063935 | A | * 3/1995 | ............ G02B 6/122 |
| JP | 08/330673 | | 12/1996 | |
| JP | 2001/255254 | | 9/2001 | |
| JP | 2007/257753 | | 10/2007 | |
| JP | 2010/009657 | A | 1/2010 | |
| JP | 2010/049735 | A | 3/2010 | |
| WO | 2010/095333 | A1 | 8/2010 | |
| WO | 2011/033926 | A1 | 3/2011 | |

OTHER PUBLICATIONS

Almeida et al., "Nanotaper for compact mode conversion," 2003 Optical Society of America, Optics Letters, vol. 28, No. 15, Aug. 1, 2003, pp. 1302-1304.
Shi et al., "Ultrahigh light transmission through a C-shaped nanoapedure," 2003 Optical Society of America, Optics Letters, vol. 28, No. 15, Aug. 1, 2003, pp. 1320-1322.
Rausch et al., "Near Field Heat Assisted Magnetic Recording with a Planar Solid Immersion Lens," 2006 The Japan Society of Applied Physics, vol. 45, No. 2B, Feb. 24, 2006, pp. 1314-1320.
Matsumoto et al., "Writing 40 nm marks by using a beaked metallic plate near-filed optical probe," 2006 Optical Society of America, Optics Letters, vol. 31, No. 2, Jan. 15, 2006, pp. 259-261.

* cited by examiner

*Primary Examiner* — Brenda Bernardi
(74) *Attorney, Agent, or Firm* — Zilka-Kotab, PC

(57) ABSTRACT

In one embodiment, a magnetic recording head includes a spot size converter having a tapered portion, the tapered portion having at least one of a width and thickness that increases in a direction towards an air bearing surface; a waveguide surrounding the spot size converter, the waveguide having a refractive index that is lower than a refractive index of the spot size converter; and cladding adjacent the waveguide, the cladding having a refractive index that is lower than the refractive index of the waveguide. Additional systems and heads are also disclosed.

18 Claims, 24 Drawing Sheets

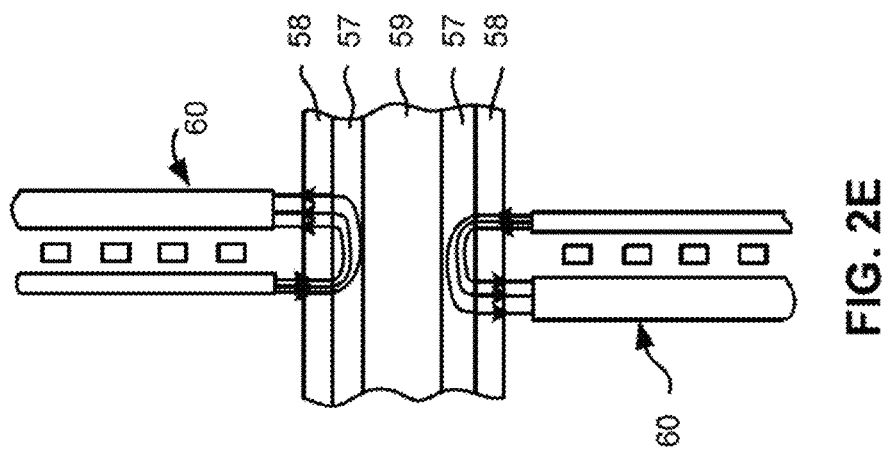
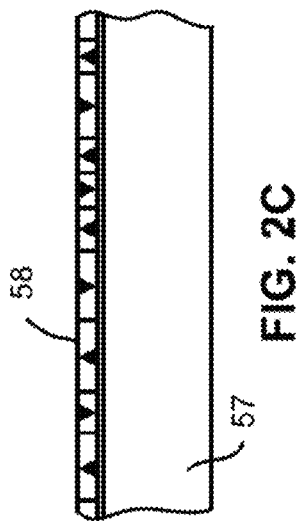
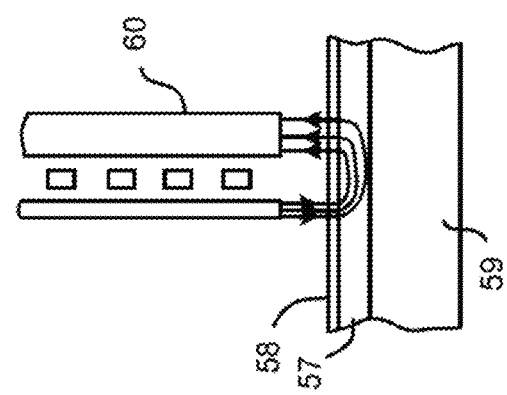
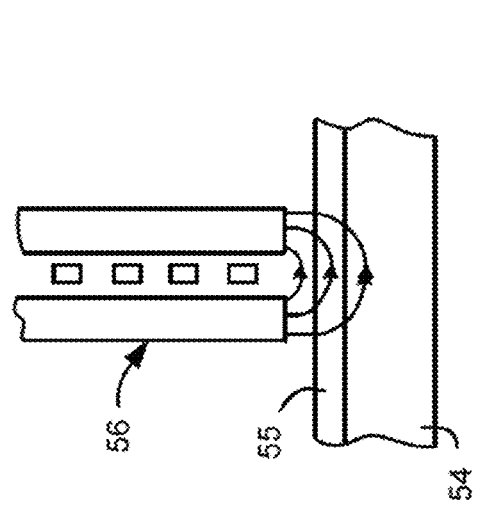

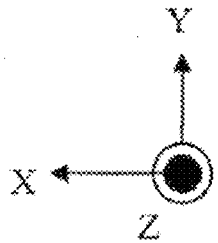
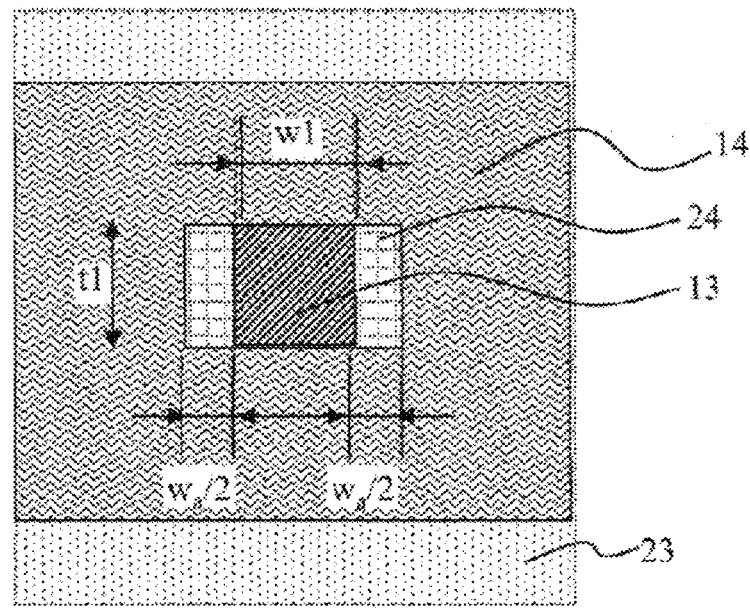
FIG. 15A
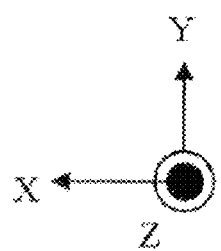
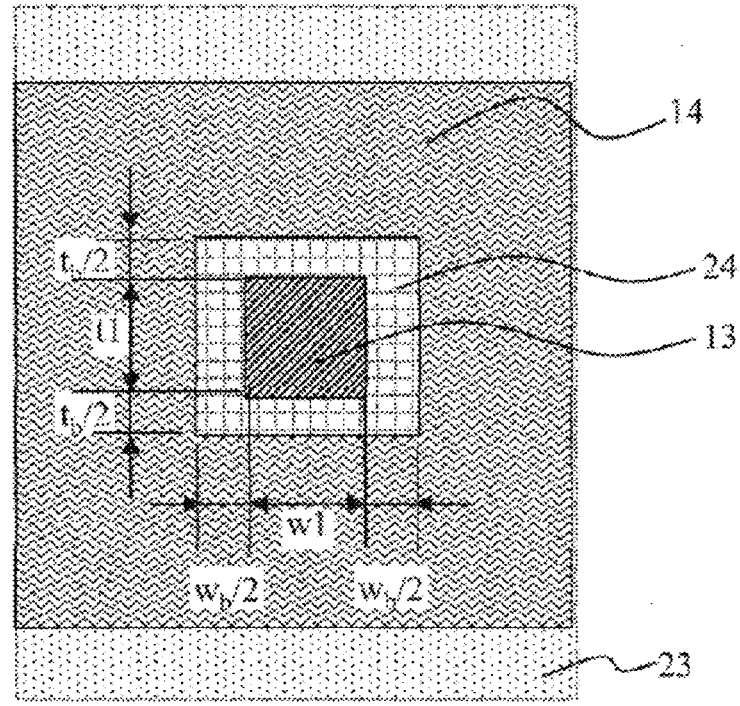
FIG. 15B

HEAT-ASSISTED MAGNETIC RECORDING HEAD WITH OPTICAL SPOT-SIZE CONVERTER FABRICATED IN 2-DIMENSIONAL WAVEGUIDE

FIELD OF THE INVENTION

The present invention relates to data storage systems, and more particularly, this invention relates to a magnetic head for heat-assisted recording in a magnetic recording device.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles.

As the information recording density of magnetic recording devices has steadily increased, the size of a magnetic recording mark for a single bit has become very small. Currently, magnetic recording devices are designed primarily with smaller recording bit sizes by reducing the size of a recording magnetic head and reducing the size of magnetic particles of the magnetic recording medium. However, as the magnetic recording density exceeds 1 Tbit/inch$^2$, a concern is that the magnetized information recorded on the magnetic recording medium will disappear in a short time at room temperature due to the effects of thermal vibrations.

One possible way to prevent such undesirable losses is by increasing the coercivity of the magnetic recording medium. However, because there is a limit to the magnitude of a magnetic field generated by the magnetic recording head, it becomes nearly impossible to form the recorded bits on the medium when the coercivity becomes too high.

In order to solve this problem, in the past few years, attention has focused on heat-assisted magnetic recording methods capable of recording on a medium having a high coercivity by heating the medium to lower the coercivity at the instance of recording. One method proposed irradiating a very small light spot at a high power density on the medium to locally heat only the recording region and achieve a high recording density as a heat-assisted magnetic recording method.

Previously, lenses have been used to generate a minute light spot, but recently, the distance between the magnetic head and the magnetic recording medium has become less than 10 nm. Consequently, the problem with optical elements such as lenses being mounted on the magnetic head is, the added weight of the lens causes the magnetic recording head to come into contact with the magnetic recording medium, i.e., the head can no longer reliably float above the medium. In addition, a plurality of magnetic recording media (e.g., disks) are stacked in a magnetic recording device, and the gap between magnetic recording media is usually no more than 1 mm; therefore, the heights of all of the components positioned in the periphery of the magnetic head must be less than the 1 mm gap size. Consequently, mounting optical elements such as lenses on the magnetic head is not desired.

An alternate method for generating a small spot size on the magnetic recording medium without using lenses is a method which forms a light guide path composed of a core and a cladding in a magnetic head. This can be achieved by forming a core having a width and thickness of the order of submicrons in a material having a large refractive index difference Δn with the cladding (explained in further detail below).

Previous light guide paths capable of converting the light spot size, use a light guide path which has a core of several tens of nanometers (nm) and is composed of a highly refractive index material. Moreover, such light guide paths thicken in a tapered shape in the propagation direction of light to couple light having a large spot size compared to the light guide path and reduce the spot size to the order of submicrons as the light propagates in the light guide path.

FIG. 8 depicts a schematic view of the changes in the light intensity profile 26 of the light propagating in a typical example of a tapered core 13 surrounded by a cladding material 23. As shown, the light spot size is reduced as the light following the tapered light guide path core 13 propagates from the narrow upper part of the core width toward the lower part having a wide core width.

Moreover, FIG. 9 depicts the principle of the spot size reduction by the tapered core. The horizontal axis shown in FIG. 9 represents the cross-sectional area of the core, while the vertical axis represents the spot size of the light which can be propagated by the core. According to FIG. 9, a region where the light from the core is propagated while penetrating deeply (i.e., the region indicated by penetration mode in FIG. 9) is used to realize the spot size conversion. According to an example illustrated in FIG. 9, the tapered core tip member P1 finally reaches P2 because the cross-sectional area of the core increases by the thickening of the core in the tapered shape, and the spot size is reduced.

However, in a magnetic recording device adopting such a heat-assisted magnetic recording method, the coupling losses increase and the light utilization efficiency decreases when the light is directly incident on a core having a width and a thickness on the order of submicrons. These undesirable effects are because the spot size of the light emitted from the light source and incident on a light guide path spreads out from several microns (μm), to several tens of microns. To realize heat-assisted magnetic recording, the emitted light power of the light source has been increased which undesirably leads to an increase in the power consumption of the entire magnetic recording device and a temperature increase in the device. In particular, the temperature increase is linked to degradation in the performance of the magnetic recording device.

In order to efficiently couple light having a spot size from several to several tens of microns, the tapered tip size must be less than several tens of nanometers (nm). When the processing precision and fluctuations are considered, the spot size converter is difficult to apply to currently manufactured products. As is clear from FIG. 9, if the refractive index difference Δn between the core and the cladding is small, the tip size can be increased, but the possible eventual reduction in the spot size of light will increase. Thus, a tapered core having a small Δn is not intended for a heat-assisted recording magnetic head with the objective of emitting a small light spot on the magnetic recording medium.

Thus, it is important to form a light guide path having very efficient coupling with light, having a widely spread out spot size, while also being capable of converting this spot to a small light spot without light losses in the magnetic head. Moreover, it may be preferable to provide a mechanism which can irradiate light having a reduced spot size on the order of submicrons with high light utilization efficiency on a magnetic recording medium by using a spot size converter formed in the magnetic recording head in a magnetic recording device having a small, lightweight optical element mounted on the magnetic head.

SUMMARY

In one embodiment, a magnetic recording head includes a spot size converter having a tapered portion, the tapered portion having at least one of a width and thickness that increases in a direction towards an air bearing surface; a waveguide surrounding the spot size converter, the waveguide having a refractive index that is lower than a refractive index of the spot size converter; and cladding adjacent the waveguide, the cladding having a refractive index that is lower than the refractive index of the waveguide.

In another embodiment, a magnetic recording head includes a spot size converter having a tapered portion, the tapered portion having a width that increases in a direction towards an air bearing surface; a waveguide surrounding the spot size converter, the waveguide having a refractive index that is lower than a refractive index of the spot size converter; and cladding adjacent the waveguide, the cladding having a refractive index that is lower than the refractive index of the waveguide.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 15A shows an example providing the cover layer on both side surfaces of the core.

FIG. 15B shows an example providing the cover layer on the periphery of the core.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic recording head includes a spot size converter having a tapered portion, the tapered portion having at least one of a width and thickness that increases in a direction towards an air bearing surface; a waveguide surrounding the spot size converter, the waveguide having a refractive index that is lower than a refractive index of the spot size converter; and cladding adjacent the waveguide, the cladding having a refractive index that is lower than the refractive index of the waveguide.

In another general embodiment, a magnetic recording head includes a spot size converter having a tapered portion, the tapered portion having a width that increases in a direction towards an air bearing surface; a waveguide surrounding the spot size converter, the waveguide having a refractive index that is lower than a refractive index of the spot size converter; and cladding adjacent the waveguide, the cladding having a refractive index that is lower than the refractive index of the waveguide.

Figure 1:
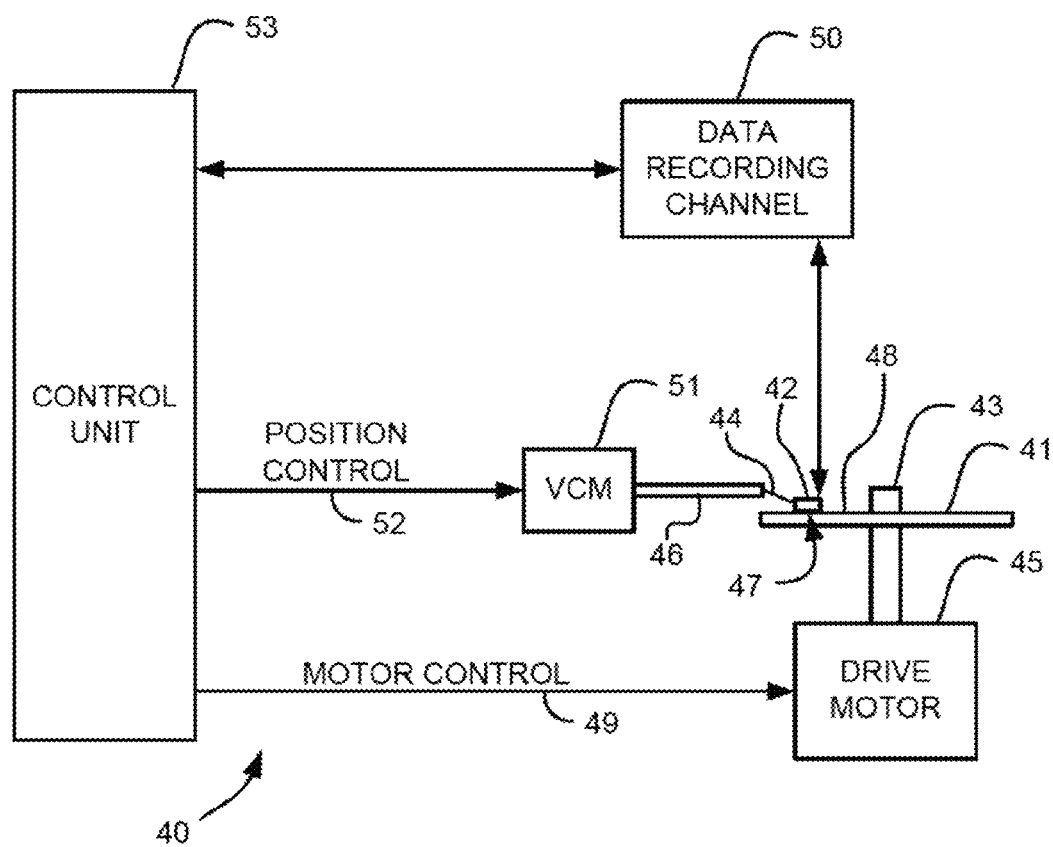
FIG. 1 is a simplified drawing of a magnetic recording disk drive system.

Referring now to FIG. 1, there is shown a disk drive 40 in accordance with one embodiment. As shown in FIG. 1, at least one rotatable magnetic disk 41 is supported on a spindle 43 and rotated by a disk drive motor 45. The magnetic recording on each disk is typically in the form of an annular pattern of concentric data tracks (not shown) on the disk 41.

At least one slider 42 is positioned near the disk 41, each slider 42 supporting one or more magnetic read/write heads 47. As the disk rotates, slider 42 is moved radially in and out over disk surface 48 so that heads 47 may access different tracks of the disk where desired data are recorded and/or to be written. Each slider 42 is attached to an actuator arm 46 by means of a suspension 44. The suspension 44 provides a slight spring force which biases slider 42 against the disk surface 48. Each actuator arm 46 is attached to an actuator 51. The actuator 51 as shown in FIG. 1 may be a voice coil motor (VCM). The VCM comprises a coil movable within a fixed magnetic field, the direction and speed of the coil movements being controlled by the motor current signals supplied by controller 53.

During operation of the disk storage system, the rotation of disk 41 generates an air bearing between slider 42 and disk surface 48 which exerts an upward force or lift on the slider. The air bearing thus counter-balances the slight spring force of suspension 44 and supports slider 42 off and slightly above the disk surface by a small, substantially constant spacing during normal operation. Note that in some embodiments, the slider 42 may slide along the disk surface 48.

The various components of the disk storage system are controlled in operation by control signals generated by control unit 53, such as access control signals and internal clock signals. Typically, control unit 53 comprises logic control circuits, storage (e.g., memory), and a microprocessor. The control unit 53 generates control signals to control various system operations such as drive motor control signals on line 49 and head position and seek control signals on line 52. The control signals on line 52 provide the desired current profiles to optimally move and position slider 42 to the desired data track on disk 41. Read and write signals are communicated to and from read/write heads 47 by way of recording channel 50.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 54 of a suitable non-magnetic material such as glass, with an overlying coating 55 of a suitable and conventional magnetic layer.

FIG. 2B shows the operative relationship between a conventional recording/playback head 56, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 57 of a material having a high magnetic permeability. This under layer 57 is then provided with an overlying coating 58 of magnetic material preferably having a high coercivity relative to the under layer 57.

FIG. 2D illustrates the operative relationship between a perpendicular head 60 and a recording medium. The recording medium illustrated in FIG. 2D includes both the high permeability under layer 57 and the overlying coating 58 of magnetic material described with respect to FIG. 2C above. However, both of these layers 57 and 58 are shown applied to a suitable substrate 59. Typically there is also an additional layer (not shown) called an "exchange-break" layer or "interlayer" between layers 57 and 58.

In this structure, the magnetic lines of flux extending between the poles of the perpendicular head 60 loop into and out of the overlying coating 58 of the recording medium with the high permeability under layer 57 of the recording medium causing the lines of flux to pass through the overlying coating 58 in a direction generally perpendicular to the surface of the medium to record information in the overlying coating 58 of magnetic material preferably having a high coercivity relative to the under layer 57 in the form of magnetic impulses having their axes of magnetization substantially perpendicular to the surface of the medium. The flux is channeled by the soft underlying coating 57 back to the return layer (P1) of the head 60.

FIG. 2E illustrates a similar structure in which the substrate 59 carries the layers 57 and 58 on each of its two opposed sides, with suitable recording heads 60 positioned adjacent the outer surface of the magnetic coating 58 on each side of the medium, allowing for recording on each side of the medium.

Figure 3A:
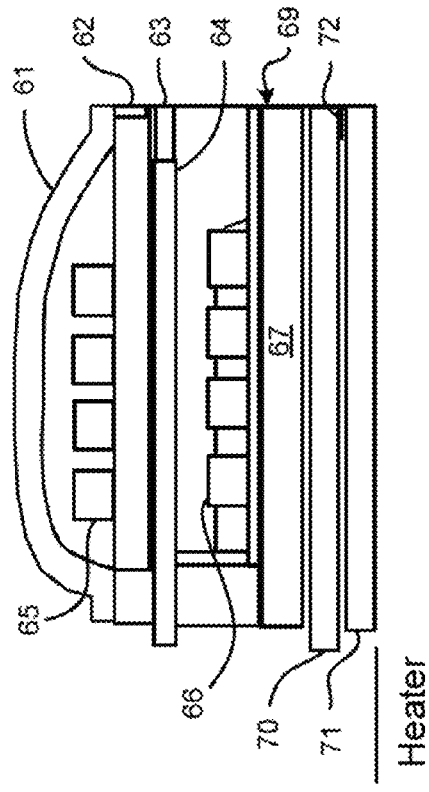
FIG. 3A is a cross-sectional view of one particular embodiment of a perpendicular magnetic head with helical coils.

FIG. 3A is a cross-sectional view of a perpendicular magnetic head. In FIG. 3A, helical coils 65 and 66 are used to create magnetic flux in the stitch pole 64, which then delivers that flux to the main pole 63. Coils 65 indicate coils extending out from the page, while coils 66 indicate coils extending into the page. Stitch pole 64 may be recessed from the ABS 69. Insulation 68 surrounds the coils and may provide support for some of the elements. The direction of the media travel, as indicated by the arrow to the right of the structure, moves the media past the lower return pole 67 first, then past the stitch pole 64, main pole 63, trailing shield 62 which may be connected to the wrap around shield (not shown), and finally past the upper return pole 61. Each of these components may have a portion in contact with the ABS 69. The ABS 69 is indicated across the right side of the structure.

Perpendicular writing is achieved by forcing flux through the stitch pole 64 into the main pole 63 and then to the surface of the disk positioned towards the ABS 69.

Figure 3B:
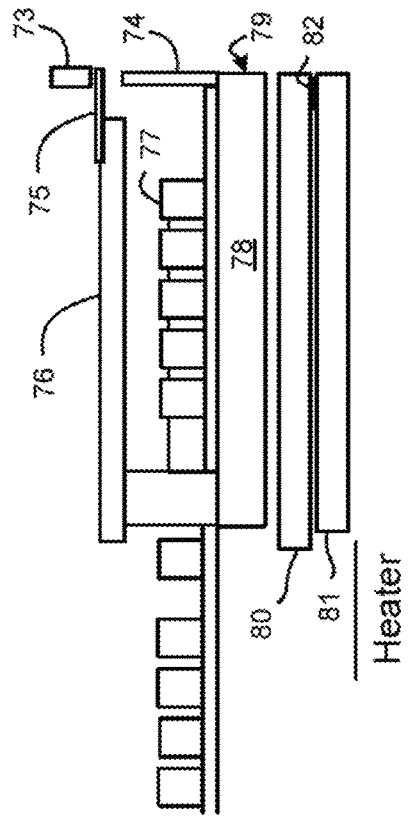
FIG. 3B is a cross-sectional view of one particular embodiment of a piggyback magnetic head with helical coils.

FIG. 3B illustrates a piggyback magnetic head having similar features to the head of FIG. 3A. Two shields 62, 67 flank the stitch pole 64 and main pole 63. Also sensor shields 70, 71 are shown. The sensor 72 is typically positioned between the sensor shields 70, 71.

Figure 4A:
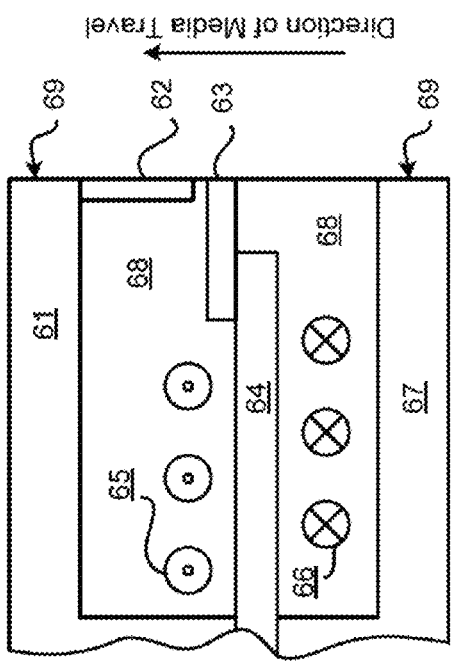
FIG. 4A is a cross-sectional view of one particular embodiment of a perpendicular magnetic head with looped coils.

FIG. 4A is a schematic diagram of one embodiment which uses looped coils 77, sometimes referred to as a pancake configuration, to provide flux to the stitch pole 76. The stitch pole then provides this flux to the main pole 75. In this orientation, the lower return pole is optional. Insulation 78 surrounds the coils 77, and may provide support for the stitch pole 76 and main pole 75. The stitch pole may be recessed from the ABS 79. The direction of the media travel, as indicated by the arrow to the right of the structure, moves the media past the stitch pole 76, main pole 75, trailing shield 74 which may be connected to the wrap around shield (not shown), and finally past the upper return pole 73 (all of which may or may not have a portion in contact with the ABS 79). The ABS 79 is indicated across the right side of the structure. The trailing shield 74 may be in contact with the main pole 75 in some embodiments.

Figure 4B:
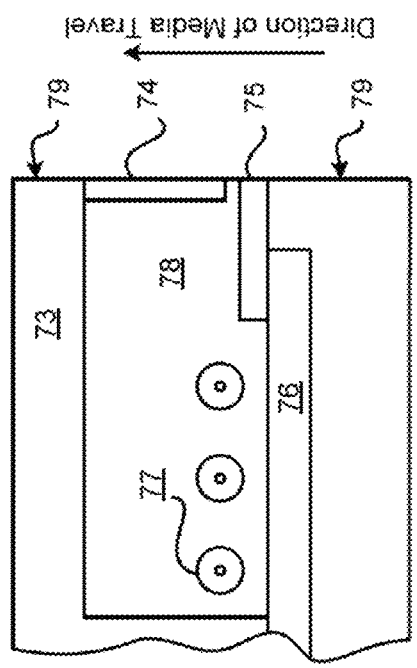
FIG. 4B is a cross-sectional view of one particular embodiment of a piggyback magnetic head with looped coils.

FIG. 4B illustrates another type of piggyback magnetic head having similar features to the head of FIG. 4A including a looped coil 77, which wraps around to form a pancake coil. Also, sensor shields 80, 81 are shown. The sensor 82 is typically positioned between the sensor shields 80, 81.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

As described above, achieving a small spot size on the magnetic medium is desirable to locally heat the recording region and achieve a high recording density. In order to achieve this objective, the various embodiments described and/or suggested herein may preferably incorporate a tapered spot size converter which positions a light source on the top surface of the magnetic head. Referring to the present description, the top surface of the magnetic head refers to the surface opposite the surface forming the air bearing surface (ABS) of the magnetic head.

Figure 7:
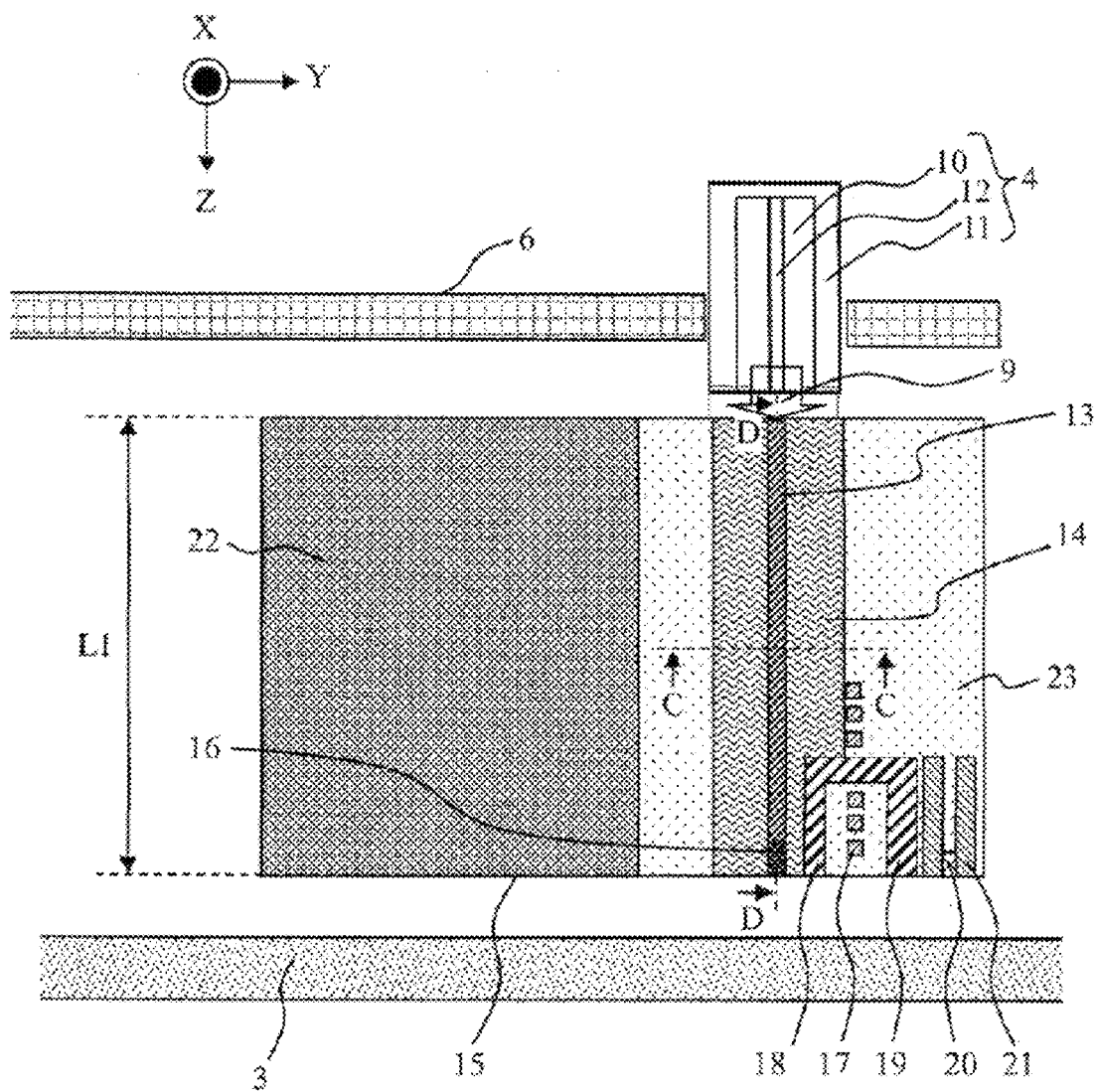
FIG. 7 is a cross-sectional schematic view of a magnetic head provided with a spot size converter according to one embodiment.
Figure 8:
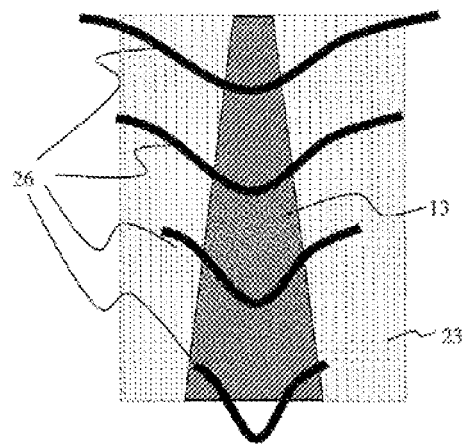
FIG. 8 is a schematic view showing the changes in the light intensity profile of the light propagated inside of the waveguide composed of a tapered core and cladding material.

FIG. 7 depicts a magnetic head in accordance with one embodiment. As an option, the present magnetic head may be implemented in conjunction with features from any other embodiment listed herein, such as those described with reference to the other FIGS. Of course, however, such magnetic head and others presented herein may be used in various applications and/or in permutations which may or may not be specifically described in the illustrative embodiments listed herein. Further, the magnetic head presented herein may be used in any desired environment.

Figure 5:
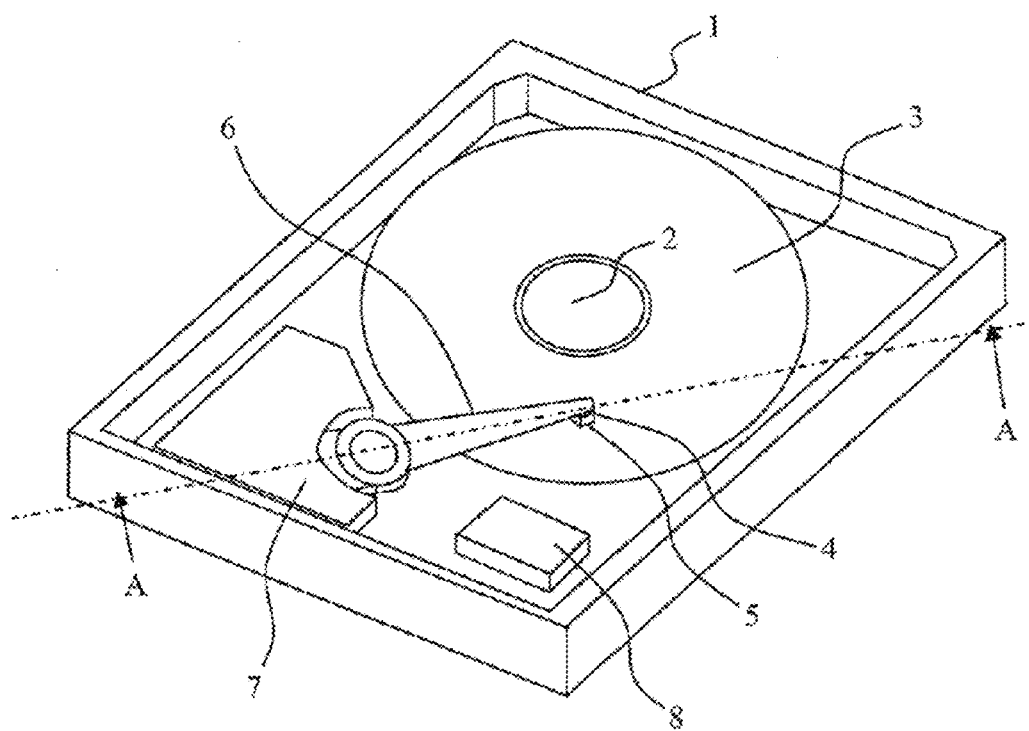
FIG. 5 is a perspective view showing one example of a magnetic recording device according to one embodiment.

An embodiment of an information recording device having a highly efficient optical integration mechanism is described with reference to FIGS. 5 and 6-7. FIG. 7 is a cross-sectional schematic view near a magnetic head having a spot size converter, and is an enlarged view of region B1-B2-B3-B4 in FIG. 6 (explained in further detail below). FIG. 5 depicts a conceptual view of important parts of the magnetic recording device with the top lid of the cabinet 1 removed; while FIG. 6 is a cross-sectional schematic view along A-A of FIG. 5.

As shown in FIG. 5, a magnetic recording medium 3 is fixed to a spindle 2 which rotates, given rotational drive by a motor. A magnetic head 5 is fixed to a suspension 6 and is positioned at the desired track of the magnetic recording medium 3 when moved by a voice coil motor 7.

Figure 6:
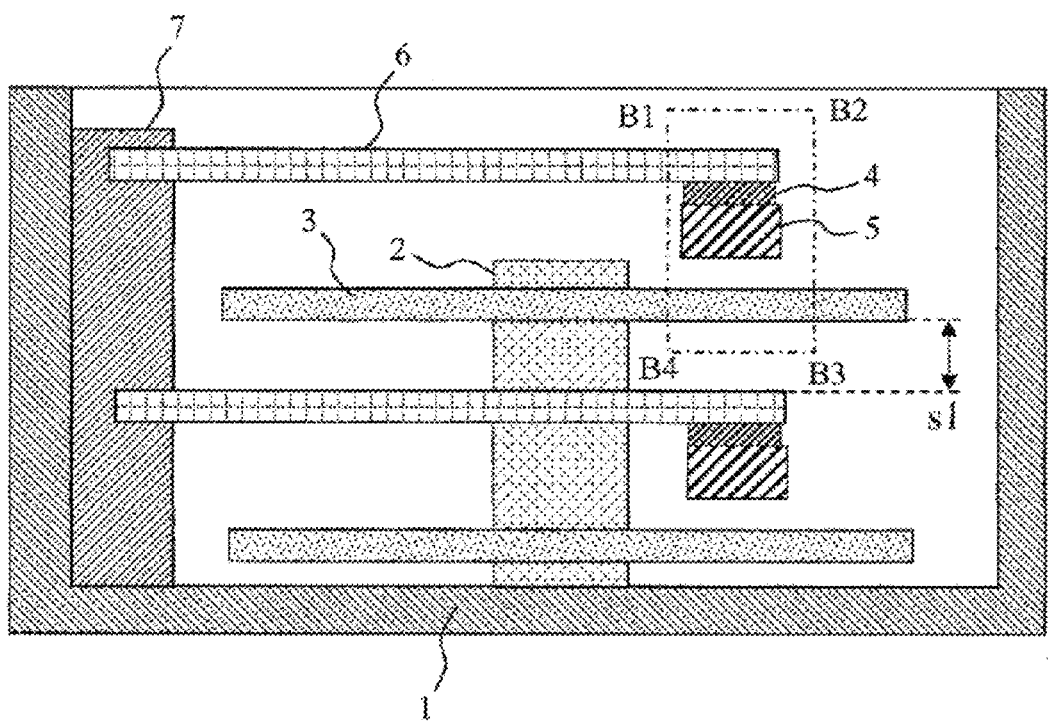
FIG. 6 is a cross-sectional view along line A-A in FIG. 5.

As shown in FIG. 6, at least one magnetic recording medium 3 and at least one suspension 6 are fixed to the spindle 2 and the voice coil motor 7 respectively. Moreover, according to the illustrated embodiment, the distance s1 between the suspension 6 and the magnetic recording medium 3 in the top stage is no more than about 1 mm; wherein the magnetic head 5 and the light source 4 emitting the light for the heat-assisted magnetic recording are mounted on the suspension 6. The light source 4 is arranged between the suspension 6 and the magnetic head 5 such that during the floating of the magnetic head 5, the heat generated by the light source 4 passes through the magnetic head 5 and can radiate heat toward the magnetic recording medium 3 side. As a result, a stable light source drive becomes possible.

As shown in FIG. 7, an ABS may be formed on the bottom surface 15 of the magnetic head. Thus, during the rotation of the magnetic recording medium 3, a negative pressure may be generated between the magnetic recording medium 3 and the bottom surface 15 of the magnetic head, causing the magnetic head to float no more than about 10 nm above the magnetic recording medium 3.

With continued reference to FIG. 7, the schematic cross-sectional view shows the periphery of the magnetic head including a part of the spot size converter 13 (explained in further detail below). The spot size converter 13 extends in the direction from the top surface of the magnetic head to the bottom surface 15 of the magnetic head; so as to preferably couple with the light (e.g., incident light 9) emitted from the light source 4. Moreover, it is preferable to propagate the light to the bottom surface 15 of the magnetic head, while irradiating light having a very small spot size on the magnetic recording medium 3 as described above. Referring to the present description, the bottom surface 15 of the magnetic head refers to the surface forming the ABS of the magnetic head.

While any suitable light source may be used, as shown in the example of FIG. 7, the light source 4 includes a semiconductor laser 10 mounted on a submount 11, generating a single mode from light. The light produced by the semiconductor laser may include wavelengths from about 760±20 nm to about 830±20 nm, depending on the desired embodiment. In one approach, the semiconductor laser 10 may make the light fall incident on the spot size converter 13 by placing an active layer 12 about perpendicular to the top surface of the magnetic head 5.

The interval between the semiconductor laser 10 and the top surface of the magnetic head 5 may be filled by a material having low light absorption and preferably a refractive index higher than that of air (e.g., greater than 1) which may further suppress the spot size width of the light emitted from the semiconductor laser 10. According to various approaches, the material filling the gap between the semiconductor laser 10 and the top surface of the magnetic head 5 may include a UV-hardened resin, a heat-hardened adhesive agent usually used to attach optical components, etc. or any other material which may function as an adhesive agent for connecting the submount 11 and the magnetic head which would be apparent to one skilled in the art upon reading the present description.

According to one approach, the light (e.g., incident light 9) emitted from the light source 4 propagates in the spot size converter 13 which reduces the spot size to the bottom surface 15 and irradiates the magnetic recording medium 3. A near-field light generating element 16 capable of generating a very small light spot may be formed in the terminal member of the spot size converter 13. According to an illustrative approach, the near-field light generating element 16 may be a metal scattering body having a triangular shape when viewed from the bottom surface 15 of the magnetic head. Moreover, a light blocking film may be formed in the periphery of the near-field light generating element 16 such that, preferably the background light present in the periphery of the near-field light generating element 16 may not irradiate the magnetic recording medium 3. According to further approaches, the near-field light generating element 16 may use a V-shaped opening or a C-shaped opening for connecting a part of the metal scattering body to the light blocking film.

With continued reference to FIG. 7, the desired magnetic field during recording may be generated by incorporating a thin film coil 17 formed inside of the magnetic head. Moreover, the generated magnetic field may be guided in the terminal member of the spot size converter by a primary magnetic pole 18, wherein according to a preferred approach, the distance between the primary magnetic pole 18 and the spot size converter 13 may be no more than about 200 nm, where "about" with reference to a value means a value providing an equivalent embodiment as that of the stated value, and/or the value ±10% of the value, absent indication to the contrary.

Additionally, an auxiliary magnetic pole 19 forming a closed magnetic circuit is included on the side opposite the magnetic film coil 17. A giant magnetoresistive (GMR) element or a tunneling magnetoresistive (TMR) element may also be formed beside the auxiliary magnetic pole 19 as the magnetic playback element 20 for playing back the recorded marks. Additionally, a shield 21 for blocking the magnetic field from the periphery is incorporated on the periphery of the magnetic playback element 20.

According to a preferred embodiment, when the magnetic recording medium 3 is rotated, the semiconductor laser 10 emits light, and magnetic recording marks are formed on the magnetic recording medium 3. The magnetic recording marks may be formed simultaneous to the moment of recording and the generation of a magnetic field by the thin film coil 17. In one approach, the magnetic recording marks may be formed as a result from heat-assisted magnetic recording.

Heat-assisted magnetic recording may be achieved as a result of the medium being heated. In a preferred approach, the medium may be heated by irradiating the light propagated by the spot size converter 13 on the magnetic recording medium 3 at about the moment the semiconductor laser 10 emits light. However, the heat-assisted magnetic recording is essentially determined by the temperature of the magnetic recording medium; therefore, the timing for generating the magnetic field and the timing for emitting light by the light source 4 do not necessarily have to be simultaneous. For example, the magnetic field may be generated after the light source 4 emits light and the magnetic recording medium 3 is heated.

Alternatively, the magnetic information may be recorded on the magnetic recording medium 3 by continuously emitting light toward the magnetic recording medium 3 and applying a magnetic field of magnetic pulses, modulated by the information to be recorded. Furthermore, magnetic information may also be recorded on the magnetic recording medium 3 by continuously applying a magnetic field and emitting light pulses, modulated by the information to be recorded.

According to one approach, a magnetic playback element 20 may be included in the magnetic head as shown in FIG. 7 to assist in playing back the magnetic recorded marks. Moreover, signal processing circuitry 8, may also be incorporated to ensure that the playback signal is processed, as shown in FIG. 5.

Figure 10A:
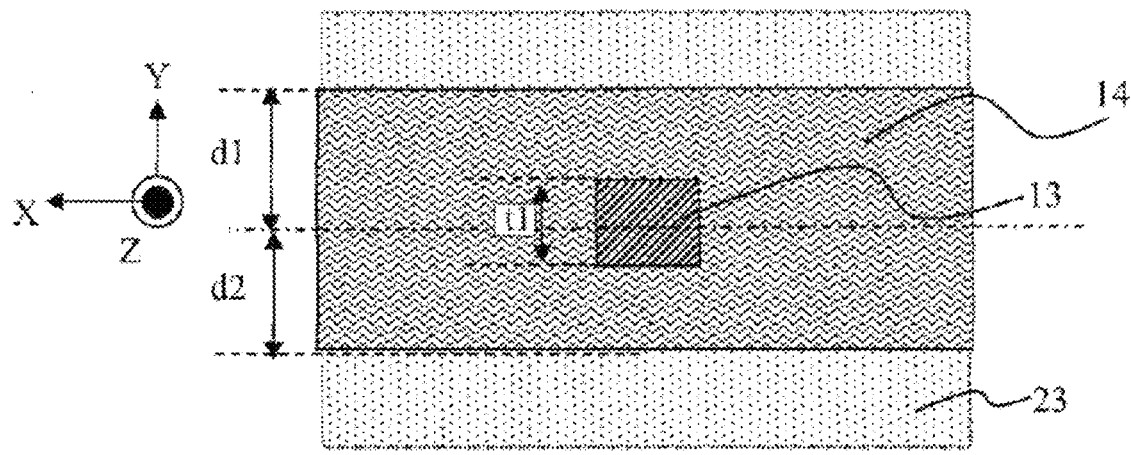
FIG. 10A is a cross-sectional view of the spot size converter formed in the 2-dimensional waveguide of one embodiment along line C-C shown in FIG. 7.
Figure 10B:
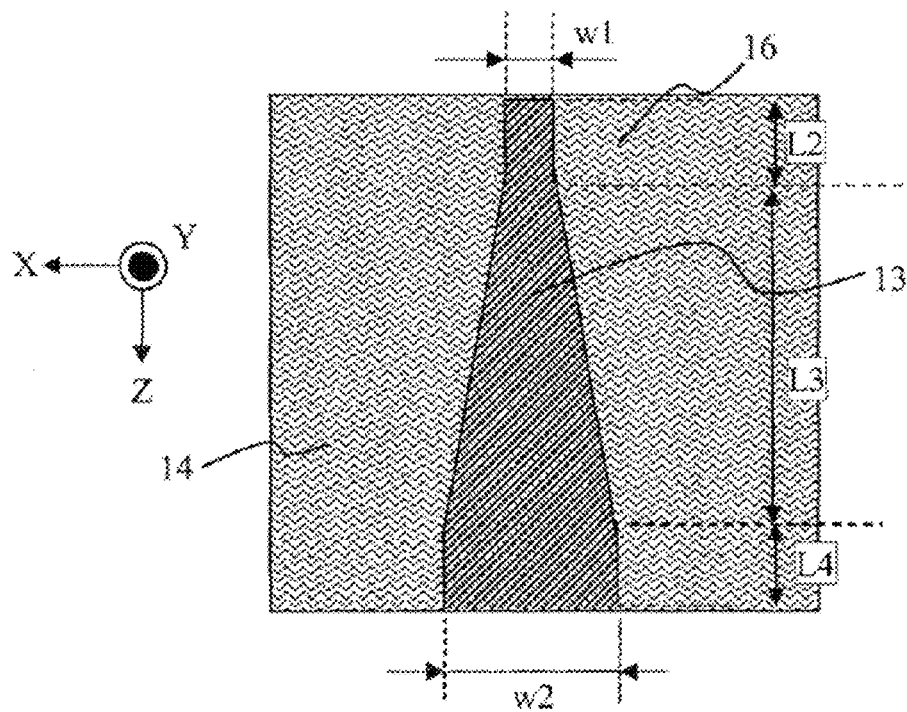
FIG. 10B is a lateral cross-sectional view of the spot size converter formed in the 2-dimensional waveguide of one embodiment along D-D shown in FIG. 7.

With continued reference to FIG. 7, in the cross-sectional view of the periphery of the magnetic head, a spot size converter 13, preferably capable of propagating light while reducing the spot size, is formed inside of the magnetic head. According to an embodiment as depicted in FIGS. 10A-10B, the spot size converter may preferably combine an essentially rectangular shape (e.g., a rectangular portion) and a shape (e.g., a tapered portion) which widens in a tapered shape toward the bottom surface (e.g., air bearing surface) of the magnetic head at the tip of the rectangular portion.

According to one approach, the rectangular portion of the spot size converter 13 preferably flattens the wavefront of the propagated light, while the tapered portion allows for the light spot size to be reduced. As the light following the tapered portion of the spot size converter 13 propagates from the narrow upper width of the spot size converter 13, toward the lower part having a wider width, the spot size is effectively reduced. By incorporating a tapered design, light having a spot size on the order of nanometers may be emitted from the bottom surface of the magnetic head. As a result, this approach may produce the penetration mode in the direction towards the air bearing surface.

In one approach, a tapered spot size converter may incorporate at least one of the width and thickness of the tapered portion of the spot size converter which transitions from below a width and/or thickness producing a penetration mode, to above the width and/or thickness that is below the width and/or thickness producing the penetration mode.

According to one approach, a lower part of the spot size converter positioned between the tapered portion and the air bearing surface may incorporate about a constant width therealong. In another embodiment, a portion of the spot size converter positioned between the tapered portion and an end of the head opposite the air bearing surface may incorporate about a constant width therealong.

In another approach, the length L2+L3+L4 of the spot size converter 13 in the Z direction shown in FIGS. 10A-10B may be equal to the length of the magnetic head between the air bearing surface and the opposite end thereof. According to various approaches, such length may be from about 180 μm to about 230 μm, but may be higher or lower depending on the desired embodiment.

In another approach, the region of the spot size converter 13 associated with L3 may extend to the ABS and/or the end of the head opposite the ABS.

With continued reference to FIGS. 10A-10B, a waveguide 14 (e.g., of alumina. $SiO_2$—$Si_3N_4$, etc.) may surround the spot size converter 13. Moreover, a cladding material 23 (e.g., of alumina, AlTiC, $SiO_2$—$Si_3N_4$, etc.) may also be adjacent the aforementioned waveguide 14.

As shown in FIG. 7, the waveguide 14 may preferably couple to the incident light 9, thereby propagating light highly efficiently within the spot size converter 13. Thus, in one approach, the waveguide 14 features an effectively infinitely wide width in the direction of the X axis.

According to various approaches, the thickness of the waveguide may be adjusted so that the thickness range is in the ±50% range of about 80% of the spot size for the light incident at the spot size converter. According to other approaches, the thickness of the waveguide may be adjusted so that the thickness range is about 40% to about 120% of a diameter of a spot size of light incident on the waveguide. Thus, the incident light and the waveguide are able to couple light with high efficiency; and light may efficiently propagate and couple in the spot size converter.

Additionally, the waveguide 14 may preferably include a material having a refractive index lower than the spot size converter 13 and/or greater than the cladding material 23. By incorporating refractive indexes such that the waveguide 14 has a refractive index lower than the spot size converter 13 and greater than the cladding material 23, the spot size may ultimately be further reduced, thereby increasing the efficiency of the magnetic recording head.

According to various illustrative embodiments which are in no way meant to limit the scope of the invention, the cladding material 23 may include alumina having a refractive index from about 1.54 to about 1.61. Additionally, the 2-dimensional waveguide 14 may include alumina having a refractive index from about 1.65 to about 1.68. Moreover, the spot size converter 13 may include $Ta_2O_5$ having the refractive index of about 2.13. However, according to other embodiments, if the refractive index differences (Δn) of the core material, the 2-dimensional waveguide, and the spot size converter are identical, the characteristics of the spot size converter maintain an acceptable amount of fluctuation.

In an illustrative example, which is in no way meant to limit the invention. $Si_3N_4$, which has a refractive index of about 1.89 to about 2.10, may be included in the spot size converter 13. Moreover, the 2-dimensional waveguide 14 and the cladding material may both include $SiO_2$—$Si_3N_4$, which may be deposited, e.g., by simultaneously sputtering $Al_2O_3$ or $SiO_2$ and $Si_3N_4$. By controlling the film deposition rate of $SiO_2$ and the film deposition rate of $Si_3N_4$ at this time, the refractive index of $SiO_2$—$Si_3N_4$ may be adjusted to be between about 1.45 and about 2.10.

As described above, the spot size converter 13 has the role of irradiating light having a very small spot size on the magnetic recording medium. Light having a desirable spot size may be emitted toward the magnetic recording medium 3 by adjusting the terminal width w2 and the terminal thickness t1, e.g., as seen in FIGS. 7 and 10A-10B.

In various approaches, the width w2 of the terminal member of the spot size converter 13 may be from about 0.5 μm to about 0.6 μm, but may be higher or lower based on the desired embodiment. Additionally, the terminal thickness t1 may be from about 0.2 μm to about 0.3 μm, but may be higher or lower based on the desired embodiment. According to one approach, if a near-field light generating element 16 is formed in the terminal member of the spot size converter 13, both the width w2 and the thickness t1 may be no more than about 0.5 μm because the width w2 and the thickness t1 of the spot size converter 13 at the bottom surface of the magnetic head preferably match the dimensions of the near-field light generating element.

Referring back to FIG. 10B in conjunction with FIG. 7, the lower part of the core terminal member of the tapered portion is elongated by a length L4. According to one approach, a primary magnetic pole 18, an auxiliary magnetic pole 19, or a thin-film coil 17 may be near the core terminal member in the magnetic head. Therefore, when the light which penetrates the core is in this vicinity, the concern is that the light may be absorbed by the primary magnetic pole 18, and/or the auxiliary magnetic pole 19, and/or the thin-film coil 17, thereby drastically decreasing the light transmission efficiency.

However, by incorporating the structure shown in FIG. 10B, degradation of the light transmission efficiency is suppressed. As a result, the light propagated in the vicinity of the primary magnetic pole 18, and/or the auxiliary magnetic pole 19, and/or the thin-film coil 17 is confined within the largest core. According to the illustrative embodiment of FIG. 10B, the length L4 of the elongated member is about 30 μm. Moreover, the tip width w1 and/or thickness t1 of the tip member of the spot size converter 13 shown in FIG. 10B are less than the width and/or thickness where the penetration mode described above is entered. By setting the tip of the spot size converter 13 in penetration mode, the spot size of the light can be converted by the structure shown in FIG. 10B.

The width or thickness (Ww) producing the penetration mode modifies the O-mode standing wave condition equation in the light guide path and is represented approximately by the following equation:

$$Ww = \frac{\pi}{2\pi \cdot n_1 \cdot \sin\theta_1 / \lambda} \qquad \text{Equation 1}$$

$$\theta_1 = \sin^{-1}\left(\frac{\sqrt{n_1^2 - n_2^2}}{n_1}\right) \qquad \text{Equation 2}$$

where $\theta_1$ is the critical angle of light at the core and cladding interface, $\lambda$ is the wavelength of light in a vacuum, $n_1$ is the refractive index of spot size converter, and $n_2$ is the refractive index of 2-dimensional waveguide or cladding material.

Figure 11:
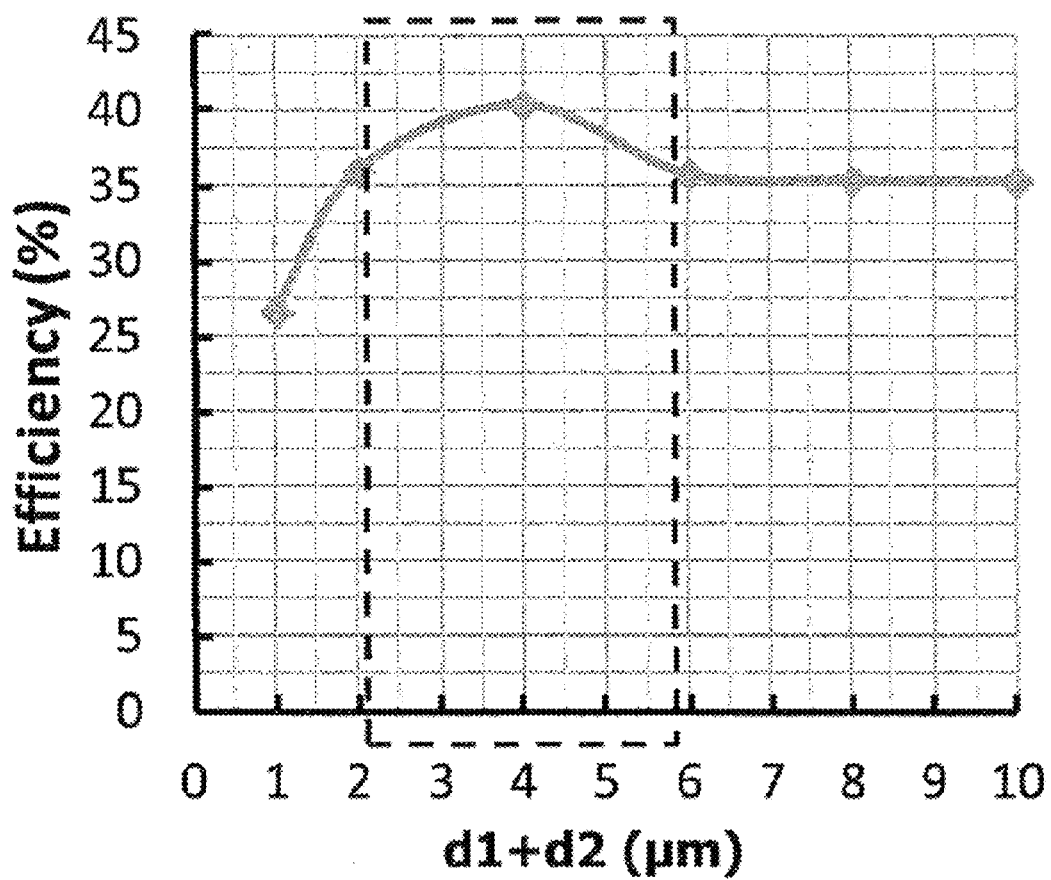
FIG. 11 shows the relationship between the thickness of the 2-dimensional waveguide and the light utilization efficiency of the spot size converter.

In the spot size converter of the embodiment described above, the 2-dimensional waveguide 14 plays the role of very efficiently coupling the incident light 9, as well as propagating and coupling light in the spot size converter 13. Referring to FIG. 11, the result of using the Beam Propagation Method (BPM) to calculate the dependence of the light utilization efficiency of the spot size converter on the thickness (d1) of the 2-dimensional waveguide 14 is depicted.

The horizontal axis in FIG. 11 represents the thickness d1+d2 of the 2-dimensional waveguide of FIG. 10A, while the vertical axis represents the light utilization efficiency of the spot size converter. Referring to the present description, the light utilization efficiency represents the emitted light power divided by the incident light power from the spot size converter. According to the illustrative embodiment depicted in FIG. 11, the incident light of the spot size converter has a wavelength of 830±20 nm, and the polarized light is linearly polarized light in the Y direction. Additionally the spot size is set to 5 μm so that the upper and lower layer thicknesses (d1 and d2 respectively) are equal (i.e., d1=d2) or about equal in the 2-dimensional waveguide shown in FIG. 10A.

With continued reference to the calculations graphed in FIG. 11, the thickness t1 of a spot size converter 13 of a type shown in FIGS. 10A-10B is 0.3 μm; the length of L2 is 0 μm; the length of L3 is about 180 μm to about 200 μm; and the width w1 is 0.07 μm. As a result, it is clear from FIG. 11 that the light utilization efficiency is maximized at a thickness d1 of approximately 4 μm, wherein the thickness d1+d2 corresponds to a spot size which is exactly 80% of the spot size of the incident light. Moreover, the light utilization efficiency when the thickness d1 is essentially infinite is equal to the light utilization efficiency when the thickness d1+d2 is at least 6 μm. The case when the thickness d1+d2 is sufficiently thick is recognized as being equivalent to the case when the thickness d1+d2 is essentially infinite from the perspective of the incident light.

As seen in FIG. 11, if the thickness d1+d2 is adjusted to be between about 2 μm and about 6 μm; however, a light utilization efficiency higher than when the thickness d1+d2 is essentially infinite may be achieved. According to a preferred approach, the thickness range of d1+d2 may be about ±50% range of 80% of the spot size of the incident light. Moreover, the thickness of the waveguide may be adjusted to fit in this range. The spot size of the incident light can be guided by using the following analytical equation:

$$D(z) = D\sqrt{1 + \left(\frac{\lambda * z}{n * \pi (D/2)^2}\right)} \qquad \text{Equation 3}$$

where D(z) is the spot size of incident light,

D is the spot size of light emitted from the light emitting end of the light source, $\lambda$ is the wavelength in a vacuum of the light emitted from the light source, n is the refractive index of the medium for propagating the light emitted from the light emitting end of the light source until incident at the spot size converter, and z is the distance from the light emitting end of the light source to the surface where the light is incident on the spot size converter.

In this embodiment, the upper and lower layer thicknesses (d1 and d2 respectively) of the 2-dimensional waveguide become equal, but the same effects can be obtained even when the thicknesses of the upper and lower layers differ.

Figure 12A:
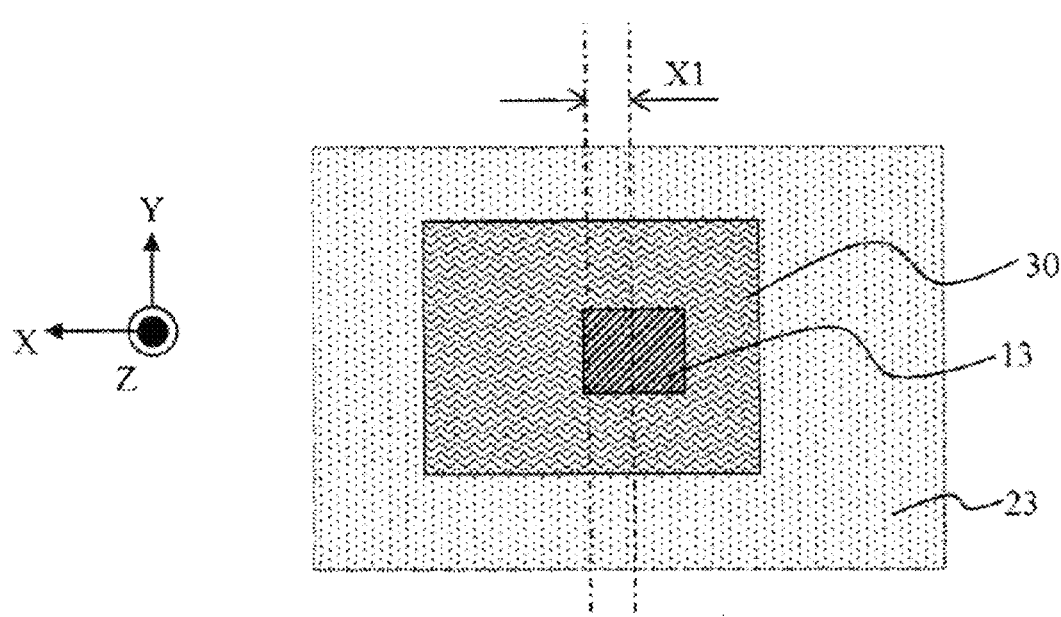
FIG. 12A shows an example when the spot size converter was formed in a 3-dimensional waveguide.
Figure 12B:
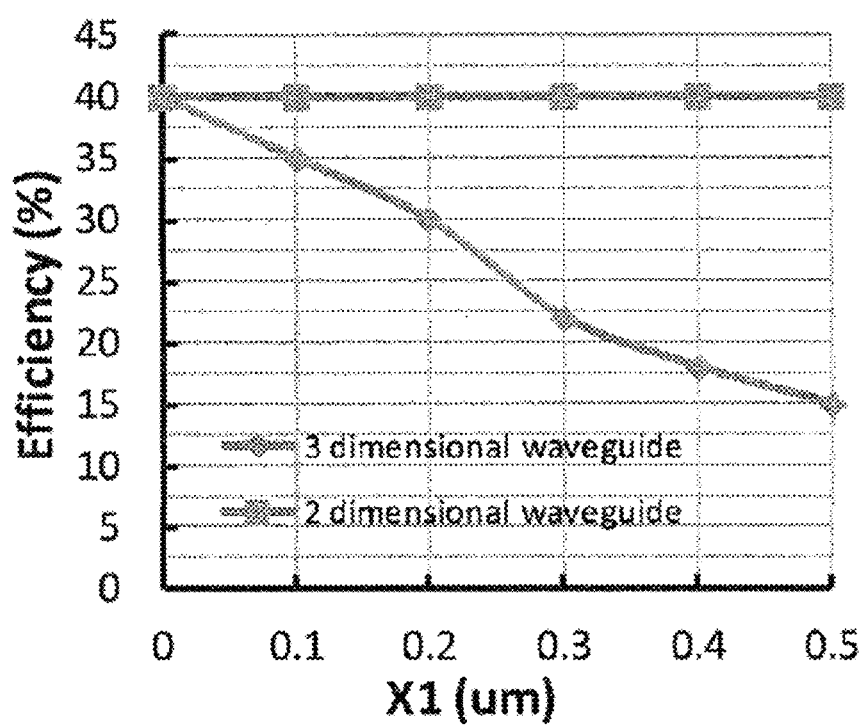
FIG. 12B shows the relationship among the placement of the 3-dimensional waveguide and the spot size converter, and the light utilization efficiency of the spot size converter.

For comparison. FIGS. 12A-12B show an example when the spot size converter 13 was formed in a 3-dimensional waveguide. In FIG. 12A, the spot size converter 13 is fabricated in a 3-dimensional waveguide 30, incorporating a material similar to that of the 2-dimensional waveguide embodiments described above.

When the center axes of the 3-dimensional waveguide and the spot size converter 13 are offset, the light utilization efficiency is calculated by using the BPM method. FIG. 12B shows the calculation results when the center axes are offset in the direction of the X axis. The horizontal axis in FIG. 12B represents the offset (X1) of the center axes in the direction of the X axis of the 3-dimensional waveguide 30 and the spot size converter 13 in FIG. 12A. The vertical axis represents the light utilization efficiency of the spot size converter.

According to the embodiment depicted in FIG. 12B, the width and thickness of the 3-dimensional waveguide were adjusted such that the light utilization efficiency became equal to the light utilization efficiency, given that several conditions were met. First, that the spot size converter 13 was formed in the 3-dimensional waveguide 30; second, that the spot size converter 13 was formed in the 2-dimensional waveguide 14, and finally, that the center axis offset (X1) in the direction of the X axis was 0. The other conditions are the same as when the spot size converter 13 is formed in the 2-dimensional waveguide 14.

For comparison, in FIG. 12B, the light utilization efficiency calculation results are also shown when the spot size converter 13 is formed in the 2-dimensional waveguide 14. When the spot size converter 13 is formed in the 3-dimensional waveguide 30, it can be verified from FIG. 12B that the center axis offset (X1) in the direction of the X axis increases while the light utilization efficiency decreases. The cause is that light coupling losses are generated by the center axis offset of light when the light propagated by the 3-dimensional waveguide 30 couples with the spot size converter 13. This is caused by the center axes of the light propagated in the 3-dimensional waveguide 30 and the light propagated in the spot size converter 13, which are offset by the center axis offset generated in the direction of the X axis of the 3-dimensional waveguide 30 and the spot size converter 13.

In addition, according to one approach, when the spot size converter 13 is formed in the 2-dimensional waveguide 14, the center axis offset in the direction of the X axis may no longer be a concern because the center axis offset in the direction of the X axis is not present in the 2-dimensional waveguide 14. Consequently, the ease of processing is improved during actual manufacturing when the spot size converter 13 is formed in the 2-dimensional waveguide 14, compared to when the spot size converter 13 is formed in the 3-dimensional waveguide.

The previous embodiments discussed a tapered shape as the shape of the spot size converter composed of a material having a higher refractive index difference between the cladding material or the 2-dimensional waveguide and the spot size converter 13. However, the structure may additionally include a cover layer having a lower refractive index than the cladding material and the 2-dimensional waveguide adjacent to the spot size converter 13 as described above. Various embodiments having at least one cover layer 24 having a refractive index lower than the 2-dimensional waveguide adjacent to the spot size converter 13 are described with reference to FIGS. 13-19.

According to one embodiment, the magnetic recording head may include at least one cover layer between the waveguide and the spot size converter, preferably to further increase the light utilization efficiency of the spot size converter. According to various other approaches, the at least one cover layer may include a cover layer above the spot size converter, below the spot size converter, surrounding the spot size converter, adjacent the spot size converter in a width direction, between the waveguide and the at least one rod-shaped core (explained in detail below), etc.

In another approach, the at least one cover layer may incorporate a lower refractive index than the spot size converter, the at least one rod-shaped core (explained in detail below), and the waveguide. Because the refractive index difference $\Delta n$ between the spot size converter and the waveguide may be effectively reduced by incorporating a cover layer, the spot size of light which can couple and propagate in the tip member of the spot size converter may be increased. As a result, incident light having a large spot size emitted from the light source can be efficiently coupled to the spot size converter.

Additionally, the wavefront of the light subjected to size conversion may preferably be as flat as possible when the spot size of the light is efficiently converted. In the spot size converter, the wavefront may be flattened by propagating light in the rectangular portion, thereby forming the cover layer of a material having a lower refractive index than the spot size converter and the 2-dimensional waveguide between the spot size converter and the 2-dimensional waveguide.

Figure 13A:
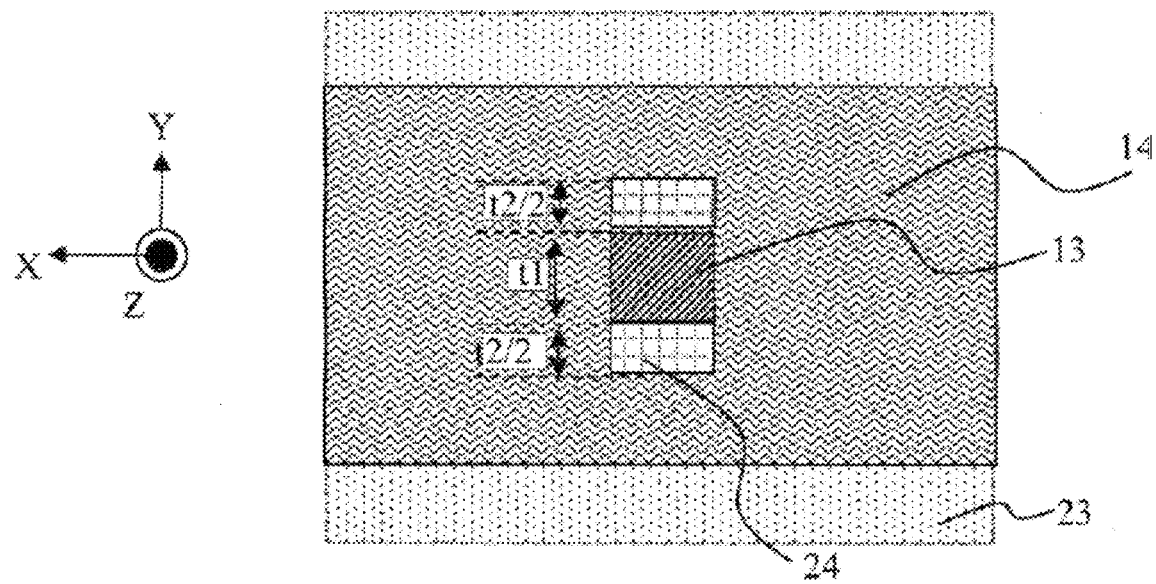
FIG. 13A is a horizontal cross-sectional view of a spot size converter having a cover layer between a spot size converter and a 2-dimensional waveguide.
Figure 13B:
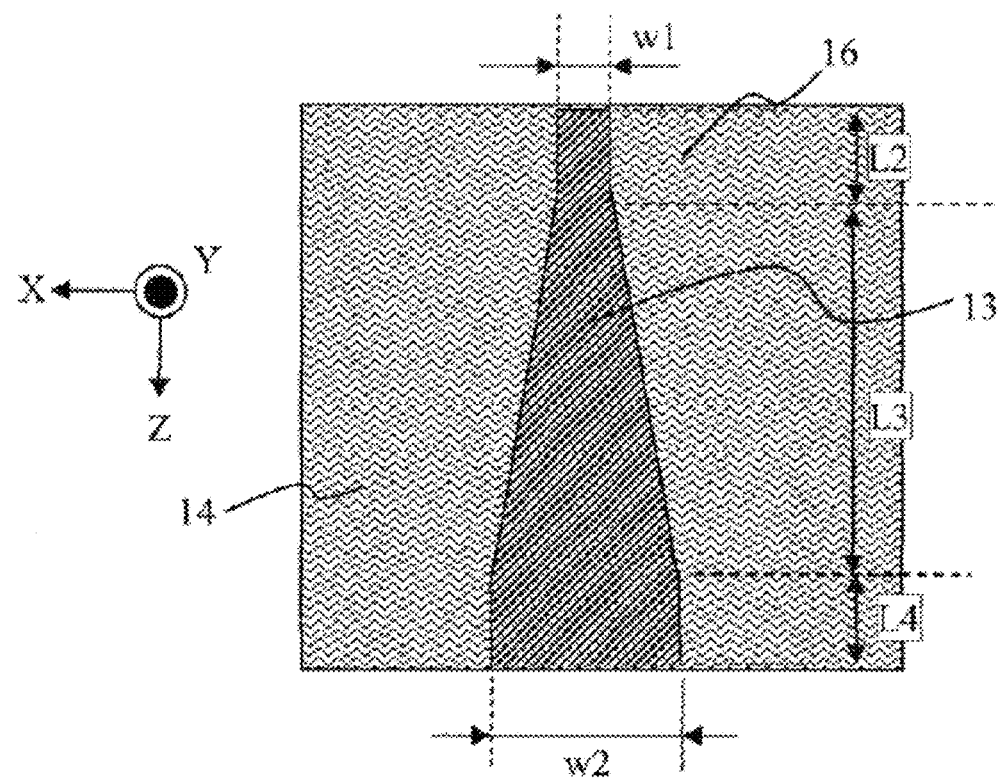
FIG. 13B is a lateral cross-sectional view of a spot size converter having a cover layer between a spot size converter and a 2-dimensional waveguide.

Referring now to FIGS. 13A-13B, the embodiment depicted includes a tip width w1 and/or thickness t1 at the tip member of the spot size converter 13 is less than the width or thickness which produces the penetration mode. Also shown in FIG. 13A are cover layers 24 which sandwich the core. By adjusting the tip member of the spot size converter 13 in this way, the refractive index difference $\Delta n$ of the core (e.g., spot size converter 13) and the cladding (e.g., 2-dimensional waveguide 14) may be essentially decreased. Therefore, the spot size of the light which can be coupled and propagated in the tip member can be further increased. As a result, the incident light 9 having a large spot size shown in FIG. 7 can be efficiently coupled to the spot size converter 13.

The part responsible for flattening the wavefront of the light coupled with the incident light 9 of the spot size converter 13 and propagated is explained when the guide path is formed in the core and cladding, and not in the rectangular portion. This forms the cover layer 15 fabricated from a material having a lower refractive index than the spot size converter 13 and the 2-dimensional waveguide 14 between the top and bottom (i.e., in the Y direction) of the spot size converter 13 and the 2-dimensional waveguide 14 as shown in the embodiment depicted in FIGS. 13A-13B.

The thickness t2 of the cover layer 15 shown in FIGS. 13A-13B may be adjusted to become the value (Tc) represented by the following equations:

$$Tc \frac{A \cdot t_1}{Ww} \qquad \text{Equation 4}$$

$$n_1 \cdot t_1 + n_3 \cdot A = n_2 \cdot (t_1 + A) \qquad \text{Equation 5}$$

where $n_1$ is the refractive index of the spot size converter, $n_2$ is the refractive index of the 2-dimensional waveguide. $n_3$ is the refractive index of the cover layer, t1 is the thickness of spot size converter, and Ww is the width or thickness for obtaining penetration mode represented by Equation 1.

In the approach that t2 is the same thickness of Tc, the refractive index difference $\Delta n$ of the core and the cladding can essentially become 0. This may ultimately result in a maximum value for the spot size of the light which can be coupled and propagated in the tip member of the spot size converter 13. Therefore, the incident light 9 having a large spot size as shown in FIG. 7 may be efficiently coupled to the spot size converter 13.

Figure 14:
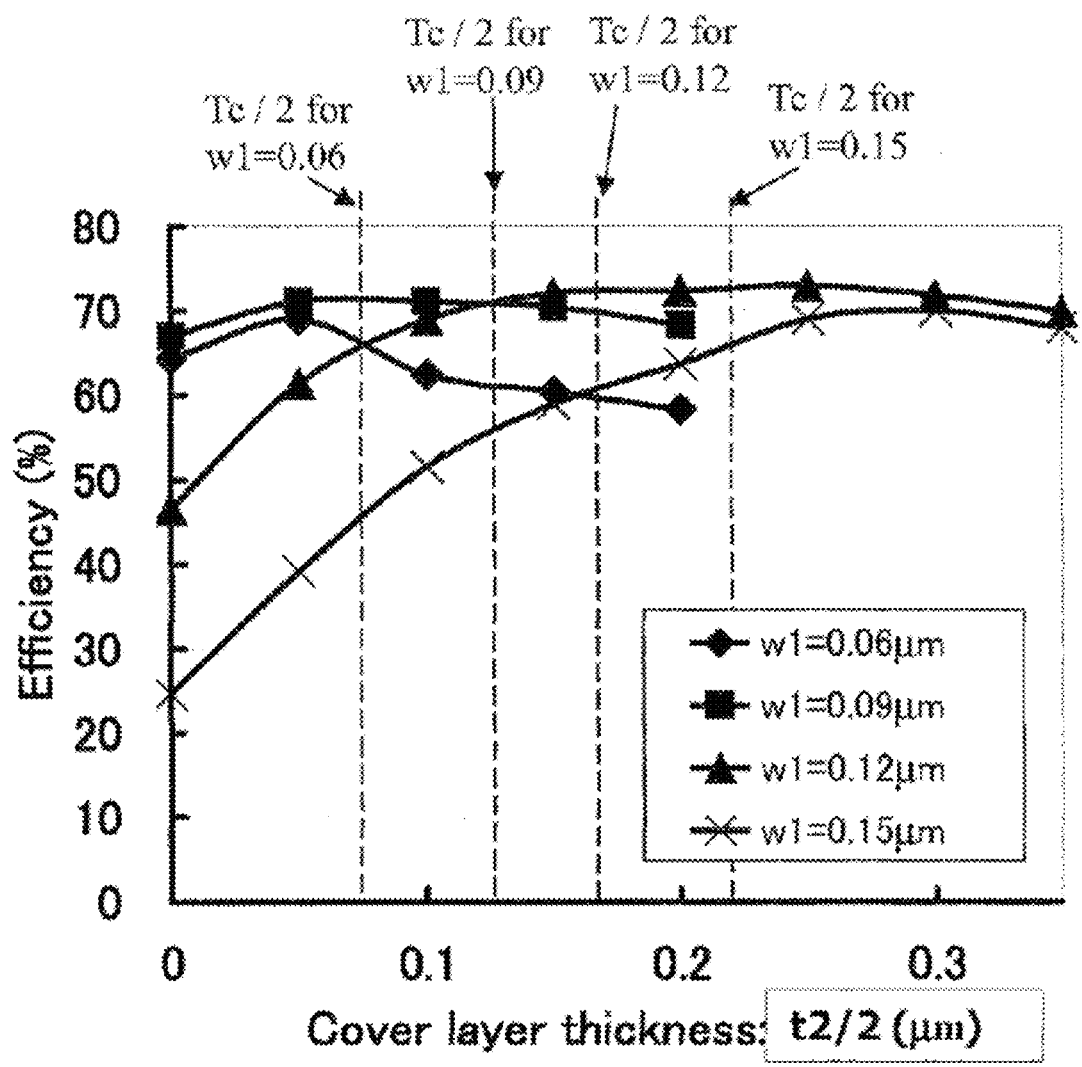
FIG. 14 shows the relationship between the thickness of the cover layer and core width and the light utilization efficiency of the spot size converter.

FIG. 14 shows the result of using the BPM method to calculate the dependence of the light utilization efficiency of the spot size converter 13 on the cover layer thickness t2. The horizontal axis in FIG. 14 represents the cover layer thickness t2/2, where the vertical axis represents the light utilization efficiency of the spot size converter. In view of the present description, light utilization efficiency refers to emitted light power divided by the incident light power from a spot size converter. According to one approach, the cover layer thickness t2 may be a thickness in the range of approximately ±30% of Tc, represented by Equation 4.

With continued reference to the illustrative example depicted in FIG. 14, the incident light to the spot size converter has a wavelength of 760±20 nm, the spot size is about 5 μm, and the polarized light is linearly polarized light in the Y direction.

It is clear from FIG. 14 that the light utilization efficiency may be at a maximum when the cover layer thickness t2 is a thickness within the range of approximately ±30% of Tc, represented by Equation 4, for each width w1 of the spot size converter.

With continued reference to the illustrative example depicted in FIG. 14, the wavelength of the incident light was set to 760±20 nm, when the wavelength is 830±20 nm. The cover layer thickness t2/2 may be determined by calculating the Tc of the new 830±20 nm by substituting 830±20 nm as the wavelength λ in Equation 1 for calculating Ww.

According to various other illustrative embodiments, the width w1 of the spot size converter may be from about 0.06 µm to about 0.15 µm, but could be higher or lower based on the desired embodiment. The cover layer thickness t2/2 may be from about 100 nm to about 350 nm, but could be higher or lower based on the desired embodiment. Similarly, Tc/2 may be from about 126 nm to about 315 nm, but could be higher or lower based on the desired embodiment.

In one approach, the cover layer 15 described above may be formed to sandwich the spot size converter 13 on both sides as shown in FIG. 15A, or be formed to sandwich the top and bottom and both sides of the spot size converter 13 as shown in FIG. 15B, in which similar effects may be obtained. The thickness or width of the cover layers as shown in FIGS. 15A-15B produce a cross-sectional area equal to that of the cover layer determined by the structure in FIGS. 13A-13B, and the optimum value may be determined.

For example, in FIGS. 13A-13B, when the width of the tip of the tapered portion is w1 and the film thickness of the optimum cover layer is t2, the cross-sectional area of the cover layer becomes w1×t2. Thus, the thickness or the width of the cover layer can be adjusted so that w1×t2 and the cross-sectional area of the cover layer in FIG. 15A (i.e., $w_a \times t1$) will be equal for FIG. 15B (i.e., $(w_b+w1) \times (t_b+t1 \times w_b)$).

Figure 9:
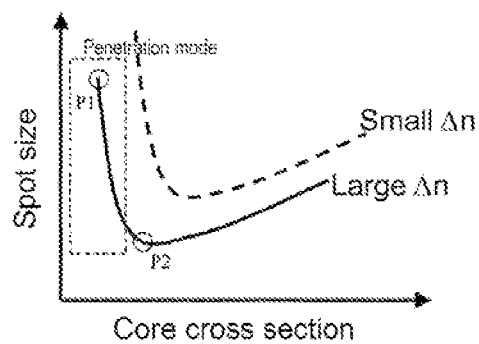
FIG. 9 is a conceptual view showing the relationship between the cross-sectional area of the core and the spot size of the light coupled and propagated in the waveguide.
Figure 16A:
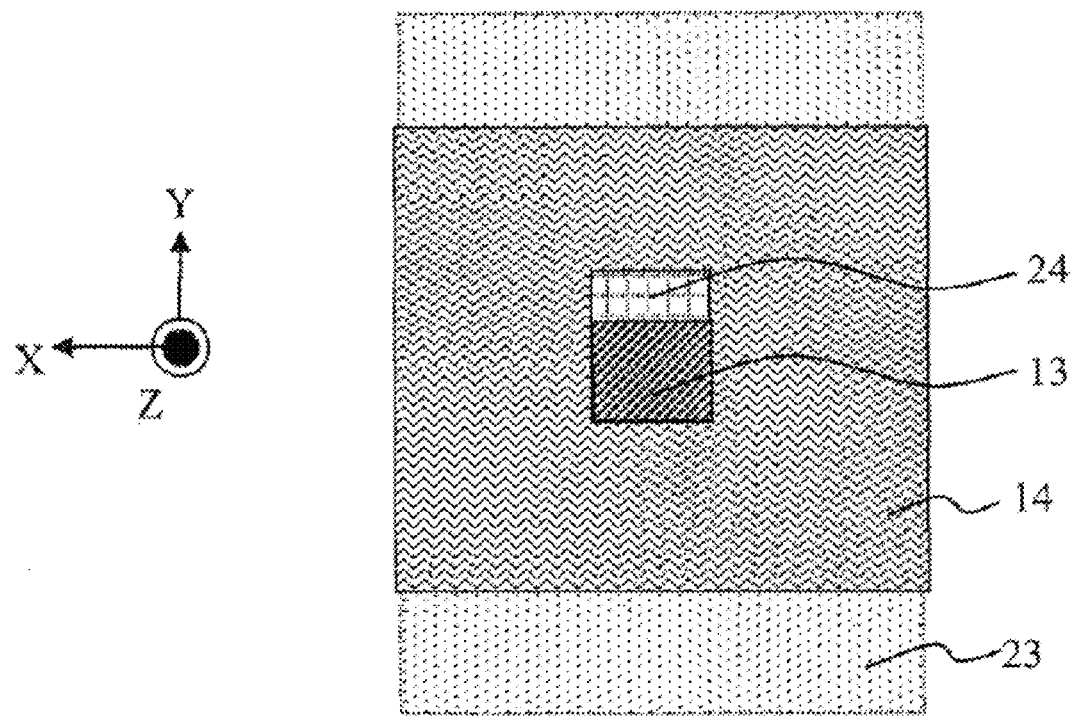
FIG. 16A shows an example providing the cover layer on only one side of the side surfaces in the Y direction of the core.
Figure 16B:
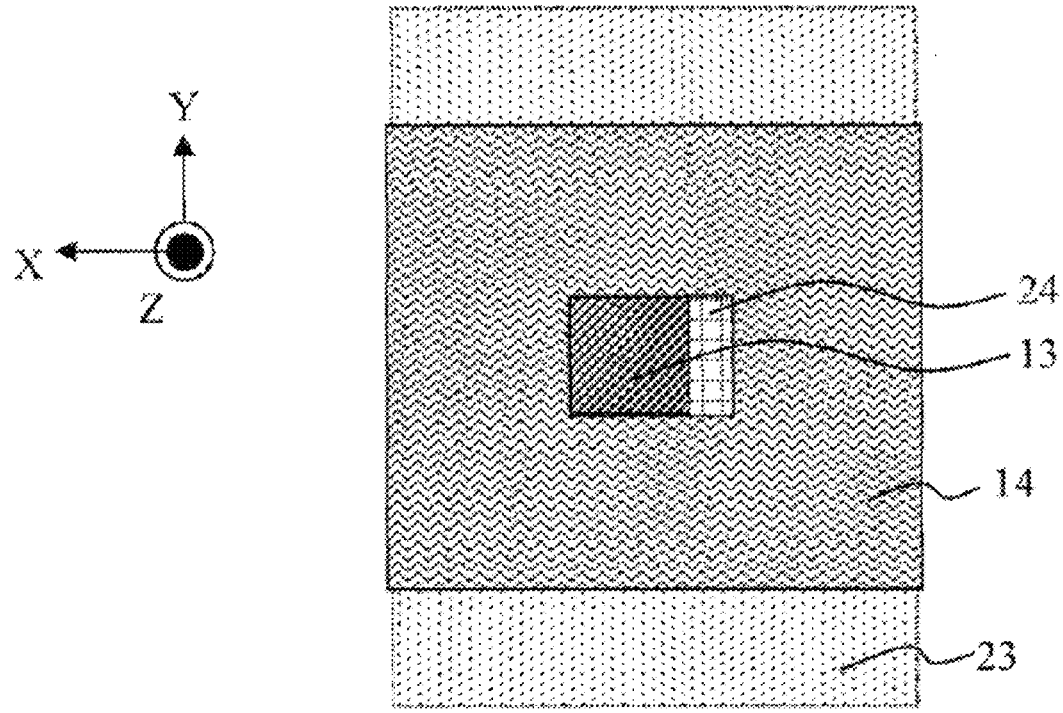
FIG. 16B shows an example providing the cover layer on only one surface of the side surfaces in the X direction of the core.

As shown in FIGS. 16A-16B, the cover layer 15 may obtain the same effect even when formed on only one side, thereby not sandwiching both sides of the spot size converter 13. As described above, the thickness or width of the cover layer in this case produces the same cross-sectional area as the cover layer determined by the structure in FIGS. 10A-10B, and the maximum value can be determined. Similarly, the thickness or width of the cover layer shown in FIGS. 9-10 may differ on the top and/or bottom layer as well as the left and/or right side.

Figure 17:
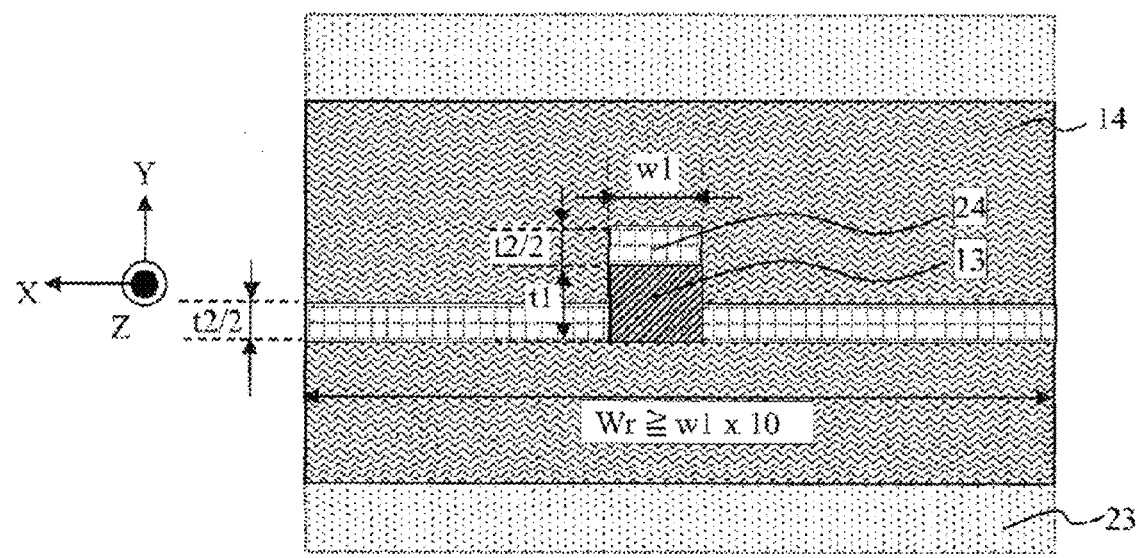
FIG. 17 shows an example of the spot size converter providing a cover layer in one part of the top surface and side surface of the core.

As shown in FIG. 17, a cover layer having the same thickness (Tc) as the top layer of the spot size converter 13 and the core top layer in a part of the side surface of the spot size converter 13 may be formed. The length in the direction of the X axis of the cover layer on the side surface may preferably be at least 10 times the width w1 of the spot size converter 13.

Figure 18:
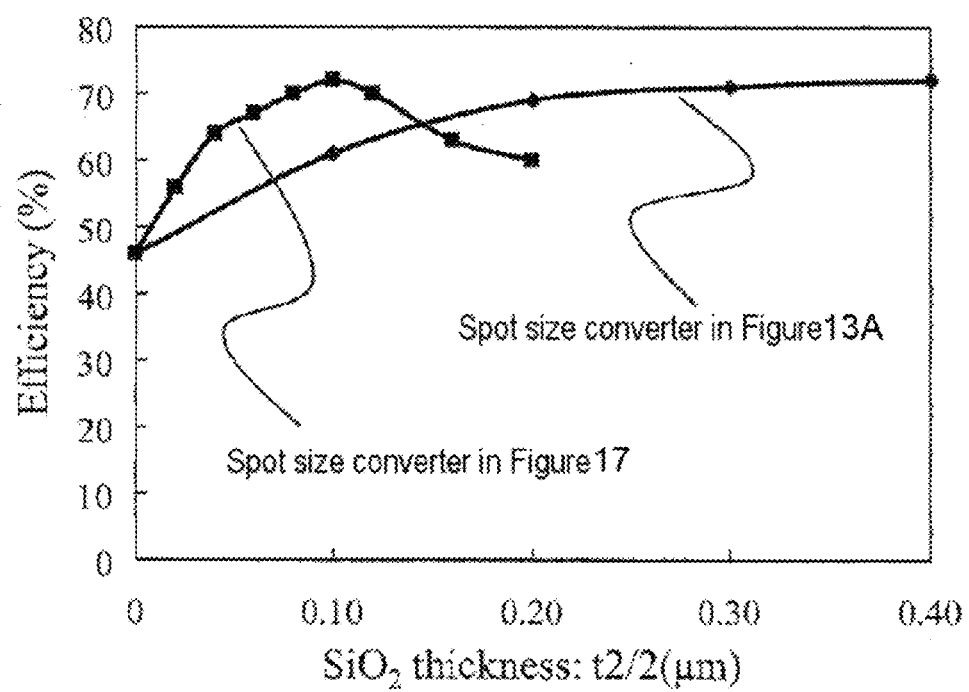
FIG. 18 shows the relationship between the thickness of the cover layer in the spot size converter shown in FIGS. 13A-13B and the light utilization efficiency.

Referring now to FIG. 18 the result of using the BPM method to calculate the dependence of the light utilization efficiency on the cover layer thickness t2 is depicted. The horizontal axis in FIG. 18 represents the cover layer thickness t2/2, while the vertical axis represents the light utilization efficiency of the spot size converter. In this illustrative example, calculations were made with w1=0.12 for the incident light on the spot size converter, having a wavelength of about 760±20 nm. Furthermore, a polarized light of linearly polarized light is incorporated in the Y direction; while a spot size of 5 µm, a thickness t1 of 0.2 µm, a length L2 of 0 µm, and a length L3 of 230 µm were used.

For comparison, the dependence on the cover layer thickness t2 of the light utilization efficiency of the spot size converter in FIGS. 13A-13B was simultaneously calculated. It is clear from FIG. 18 that in the structure example shown in FIG. 17, the light utilization efficiency equivalent to when the thickness t2 of the cover layer is approximately ¼ compared to the structure example shown in FIGS. 13A-13B may be achieved. Thus, in the structure example in FIG. 17, the thickness may be set to approximately ¼ of the optimum thickness of the cover layer obtained in the structure example in FIGS. 13A-13B.

Figure 19:
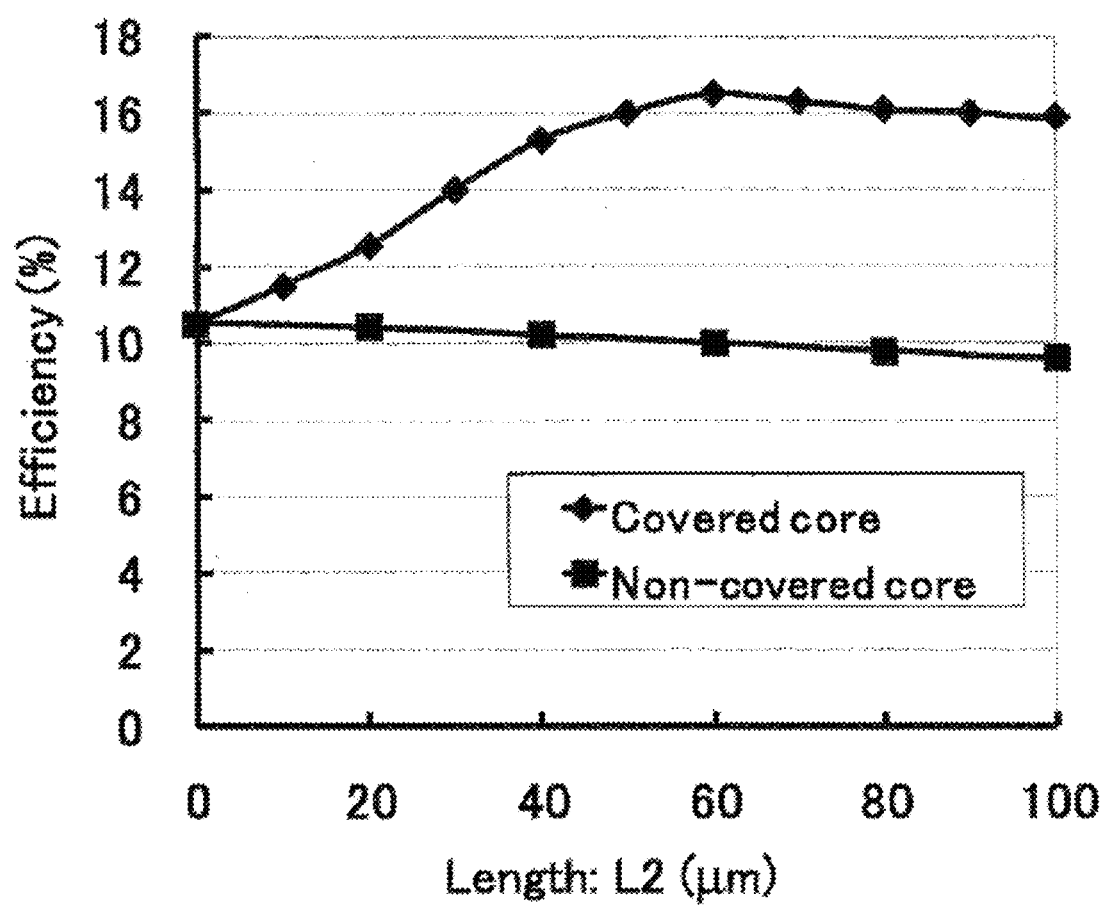
FIG. 19 compares the relationship of the length of the rectangular portion and the light utilization efficiency of the spot size converter with and without the cover layer.

In the above embodiment, as shown in FIG. 13B, the rectangular portion seen from above the XZ plane is formed in the upper part of the tapered portion. The light coupled and propagated in the rectangular portion flattens the wavefront of the light arriving at the tapered portion. Therefore, the losses generated when the spot size is reduced in the tapered portion can be suppressed. FIG. 19 shows the result of using the BPM method to calculate the dependence of the rectangular portion of the light utilization efficiency of the spot size converter 13 on the length L2. The horizontal axis shown in FIG. 19 represents the length L2 of the rectangular portion, while the vertical axis represents the light utilization efficiency of the spot size converter.

With continued reference to the illustrative example depicted in FIG. 19, the incident light on the spot size converter is light which freely propagates a distance of about 30 µm in air (e.g., in a medium having a refractive index of 1), and has a spot size of approximately 3 nm. As a result, the wavefront of the light becomes a spherical plane at the tip member of the spot size converter and is incident on the spot size converter for a wavelength of about 760±20 nm from linearly polarized light in Y direction as the polarized light. In addition, when the thickness t1 of the spot size converter is about 0.2 µm, the width w1 of the spot size converter is about 0.06 µm and the cover layer thickness t2/2 is about 60 nm (where Tc/2=84 nm).

According to various other illustrative embodiments, the width w1 of the spot size converter may be from about 0.06 µm to about 0.15 µm, but could be higher or lower based on the desired embodiment. The cover layer thickness t2/2 may be from about 100 nm to about 350 nm, but could be higher or lower based on the desired embodiment. Similarly, Tc/2 may be from about 126 nm to about 315 nm, but could be higher or lower based on the desired embodiment. For comparison, calculations were made for the case of the spot size converter of only the core without a cover layer. As a result, the width w1 of the spot size converter without the cover layer was about 0.06 µm. Therefore, when L2=0 µm the light utilization efficiency is the same as the efficiency when L2=0 µm of the spot size converter with a cover layer.

With continued reference to FIG. 19, is clear that the light utilization efficiency reaches a maximum when the length of the rectangular portion L2 is approximately 90 µm. It is also apparent that the maximum light utilization efficiency of a converted core is approximately 1.6 times that of a core without a rectangular portion incorporated (i.e., non-converted core). The decrease in efficiency as L2 exceeds 90 µm is caused by the increase in the spot size conversion losses. This is a result of having a longer length L2 coupled with a shorter (less effective) tapered portion length L3, which is responsible for reducing the spot size. Thus, when the length of the magnetic head is not restricted, L2 may be greater than 90 µm.

In addition, in the spot size converter of a core without a cover layer, even if the length L2 of the rectangular portion is lengthened, the efficiency does not increase, but conversely decreases. Therefore, the effect of flattening the wavefront by the rectangular portion does not function when there is no cover layer. As a result, in a preferred embodiment, the length L2 of the rectangular portion is about 90 µm.

Figure 20A:
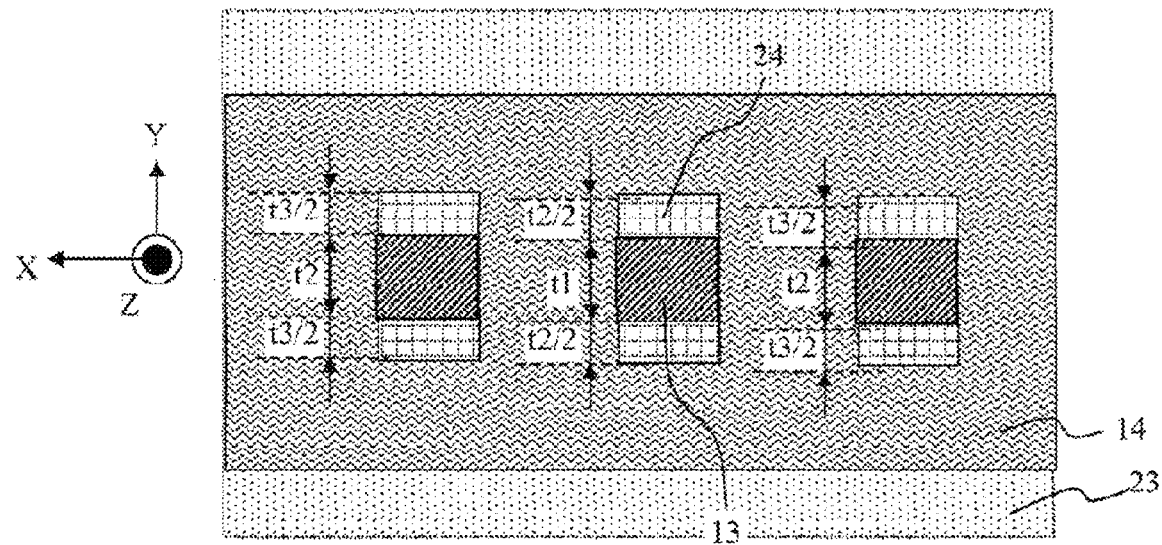
FIG. 20A shows the horizontal cross-sectional view of an example of a spot size converter formed with a rectangular portion (rod-shaped core) on both sides of the tapered portion.
Figure 20B:
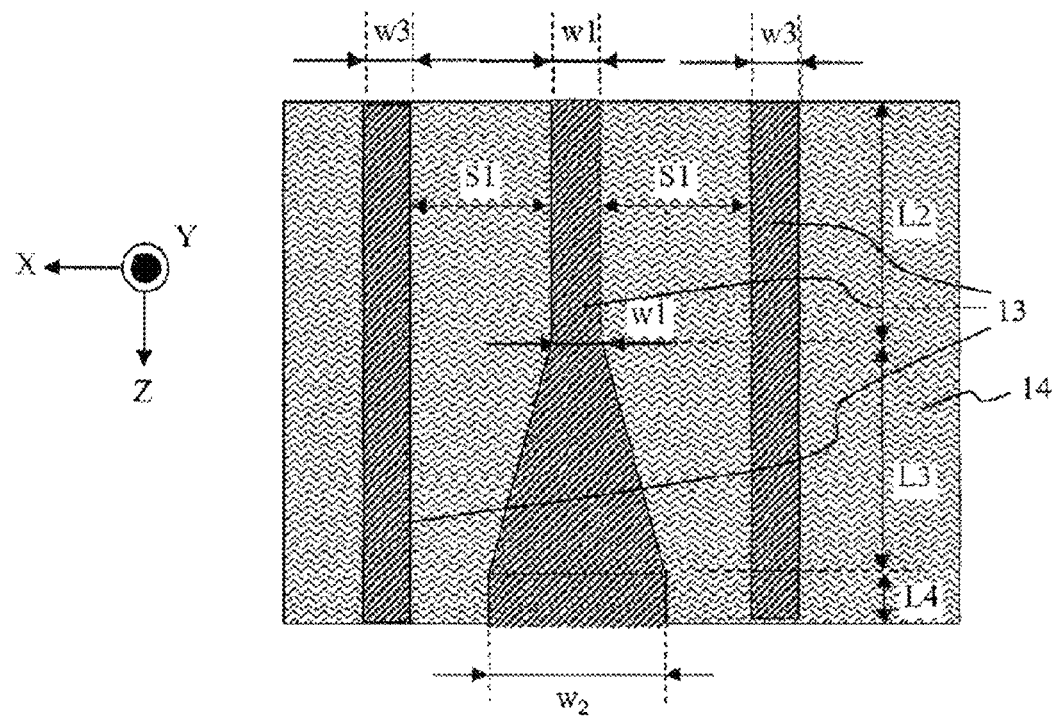
FIG. 20B shows the lateral cross-sectional view of an example of a spot size converter formed with a rectangular portion (rod-shaped core) on both sides of the tapered portion.

For the embodiment depicted in FIG. 19, the light incorporated a wavelength of 760±20 nm for the incident light, but a similar effect may be obtained for a wavelength of about 830±20 nm. Moreover, the rectangular portion was formed only in the upper part of the tip of the tapered portion. However, as shown in FIGS. 20A-20B, rod-shaped cores may be formed on both sides of the rectangular portion. In another approach, the rod-shaped cores may be on only one side of the rectangular portion.

FIG. 20A depicts a cross-sectional view in the direction about perpendicular to the light propagation direction of the spot size converter, while FIG. 20B is a cross-sectional view in the direction along the light propagation direction. In one approach, the refractive index of the rod-shaped core may preferably be similar to that of the spot size converter. Moreover, the rod-shaped core may be designed such that light coupled and propagated in the rod-shaped cores on both sides may be coupled to the tapered portion. Therefore, the light utilization efficiency of the spot size converter may be improved.

According one embodiment, in the spot size converter described above, the rectangular portion may be formed to flatten the wavefront of the light coupled thereto. In order to further improve the light utilization efficiency of the spot size converter, at least one rod-shaped core may be formed on at least one side of the rectangular portion and/or the tapered portion. Moreover, the at least one rod-shaped core may be separated from the at least one side of the rectangular portion and/or the tapered portion by a portion of the waveguide. The light utilization efficiency of the spot size converter can be improved because when the rectangular portions are formed, the light coupled and propagated to the rod-shaped cores on both sides can couple with the tapered portion.

In order for the light coupled and propagated in the rod-shaped cores on both sides to couple in the tapered portion, the light propagated by the rod-shaped cores on both sides should overlap in the tapered portion. Therefore, the distance s1 between the rectangular portion in the center and the rod-shaped cores on both sides may preferably be less than the spot radius of the light propagated by the rod-shaped core. According to one approach, the cross-sectional shape of the rod-shaped cores on both sides may not be identical to the rectangular portion in the upper part of the tapered portion.

For example, the core cross-sectional area (i.e., w3×t2) of the rod-shaped cores on both sides may be smaller than the core cross-sectional area (i.e., w1×t1) of the core in the rectangular portion in the upper part of the tapered portion. Thus the thickness t3 of the cover layer of the rod-shaped cores on both sides may be at least the thickness t2 of the cover layer for the rectangular portion in the upper part of the tapered portion. Moreover, the core cross-sectional area of the rod-shaped cores on both sides may be greater than the core cross-sectional area of the rectangular portion in the upper part of the tapered portion. Thus, the cover layer thickness t3 of the rod-shaped cores on both sides may be less than the thickness t2 of the cover layer of the rectangular portion in the upper part of the tapered portion. As a result, the light utilization efficiency of the spot size converter may be improved because the light spot size capable of being coupled and propagated in the rod-shaped cores on both sides can be equal to the light spot size capable of being coupled and propagated in the rectangular portion in the upper part of the tapered portion.

Figure 21A:
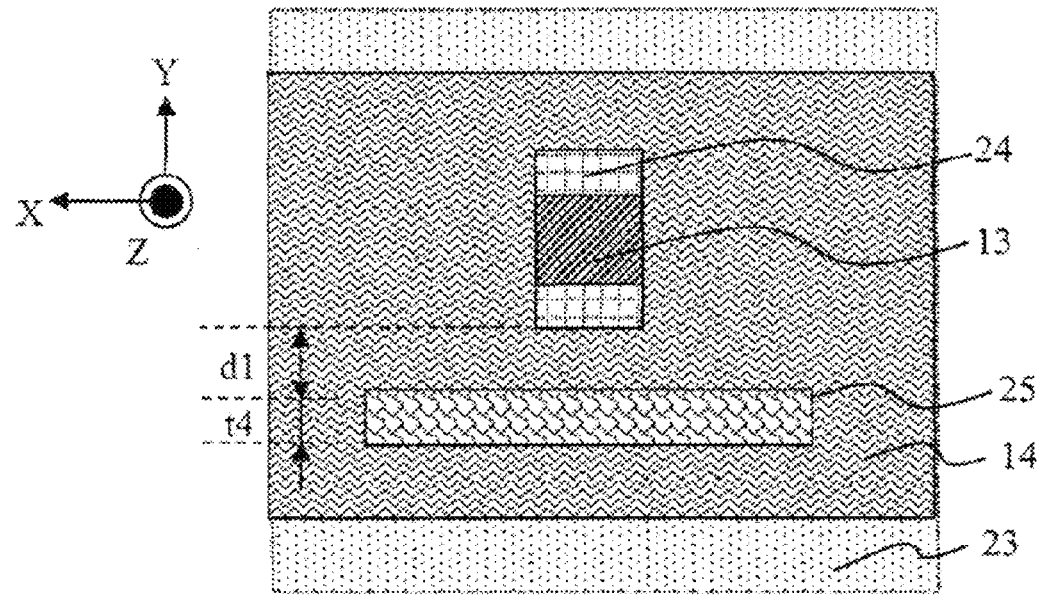
FIG. 21A shows the horizontal cross-sectional view of an example of the spot size converter formed with the thin core instead of the rectangular portion.
Figure 21B:
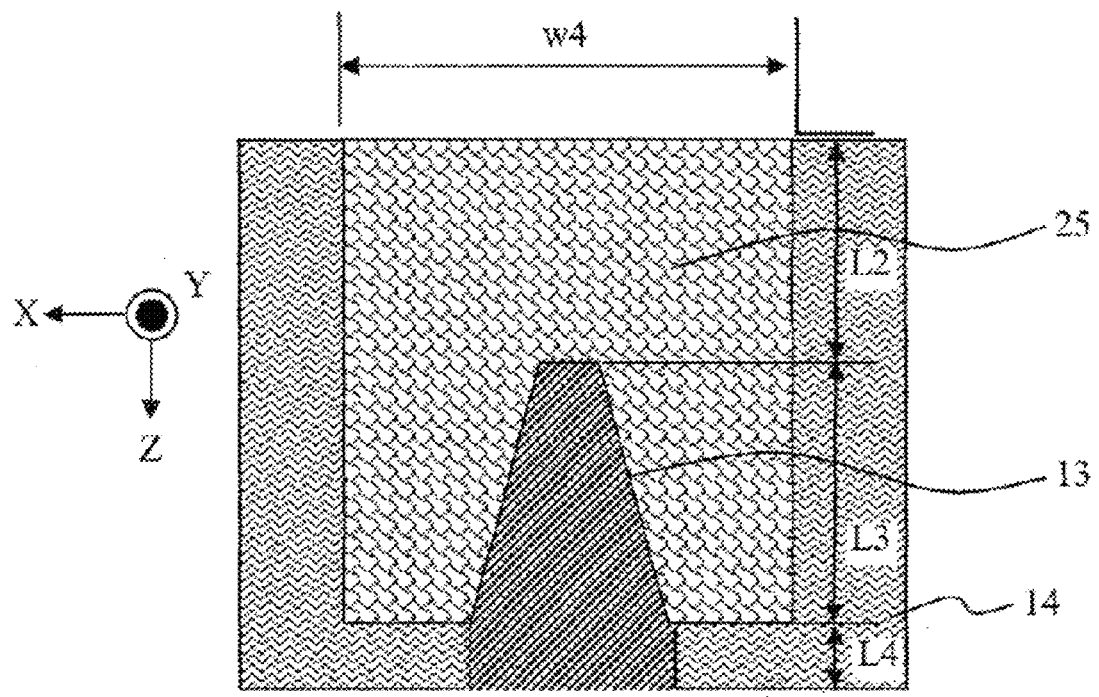
FIG. 21B shows the lateral cross-sectional view of an example of the spot size converter formed with the thin core instead of the rectangular portion.
Figure 21C:
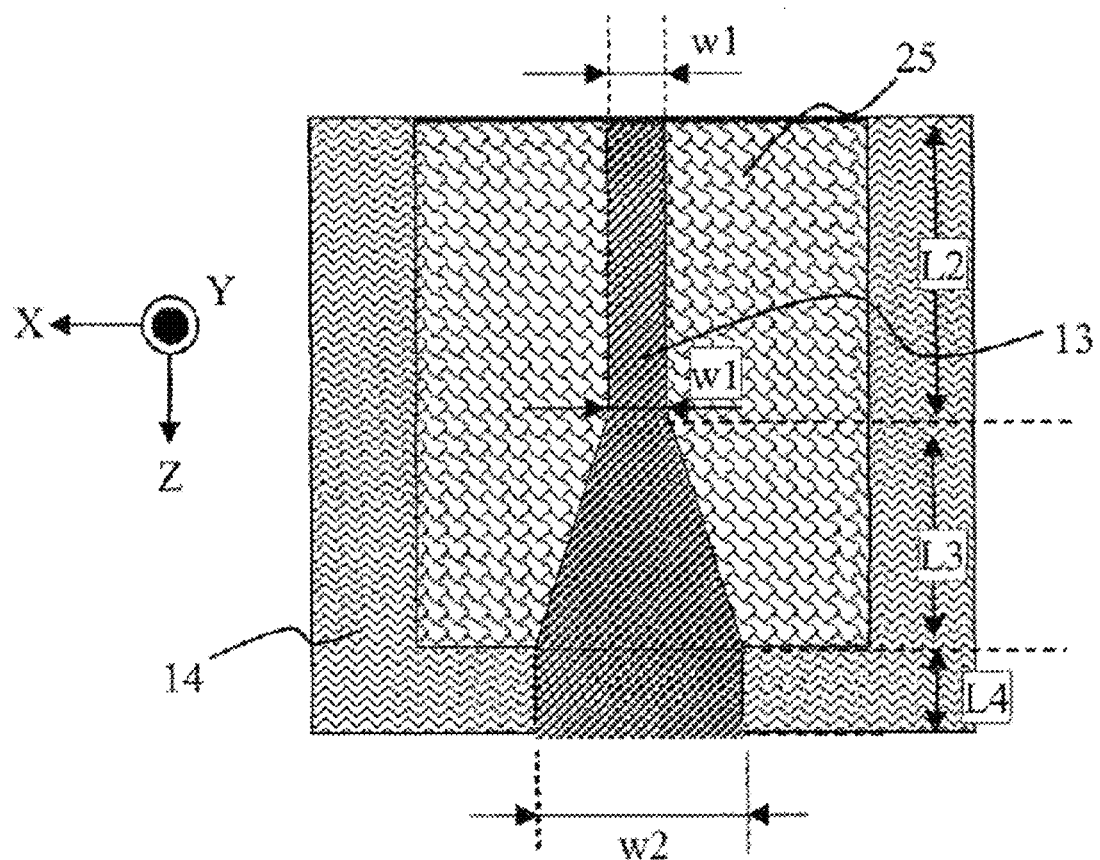
FIG. 21C shows a lateral cross-sectional view of an example of the spot size converter formed with the thin core instead of the rectangular portion, showing an example of the spot size converter combining the rectangular portion and the thin core.

Referring now to the embodiments depicted in FIGS. 21A-21C, a magnetic recording head may include a thin core 25 extending from a side of the head opposite the air bearing surface toward the air bearing surface. In one approach, the thin core 25 may be separated from the spot size converter 13 by a portion of the waveguide 14. In another approach, the thin core may preferably be wider than a maximum width of the spot size converter. FIG. 21A depicts a cross-sectional view in the direction perpendicular to the light propagation direction of the spot size converter of this embodiment; moreover, FIG. 21B shows a cross-sectional view in the direction along the light propagation direction.

As illustrated, according to one approach, the thin core 25 may not extend to the air bearing surface. Additionally, the spot size converter 13 may not extend to the end of the head opposite the air bearing surface. However, in one approach, the spot size converter may extend to the end of the head opposite the air bearing surface. See, e.g., FIG. 21C.

As shown in FIGS. 21A-21B, a thin core 25 may be formed on the side of the light emitting core instead of forming the rectangular portion on the upper part or the side of the tapered portion. In one approach, the waveguide composed only of core and cladding having the effect of flattening the wavefront of the light coupled with the incident light 9 and propagated may have a core width or thickness equal to or less than the width or thickness (Ww) for producing the penetration mode. According to a preferred embodiment which is in no way meant to limit the scope of the invention, the width w4 of the thin core 25 may be 5 µm, the thickness t4 may be 0.2 µm, and the core material of the thin core 25 may include $Al_2O_3$—$Si_3N_4$.

In FIG. 21B, a thin core 25 was formed rather than a rectangular portion. However, according to one approach, both the rectangular portion and the thin core 25 may be formed as shown in FIG. 21C. By doing this, the light coupled and propagated in the rectangular portion and the light coupled and propagated in the thin core 25 can both couple in the tapered portion, therefore, the light utilization efficiency of the spot size converter can be improved.

Figure 22:
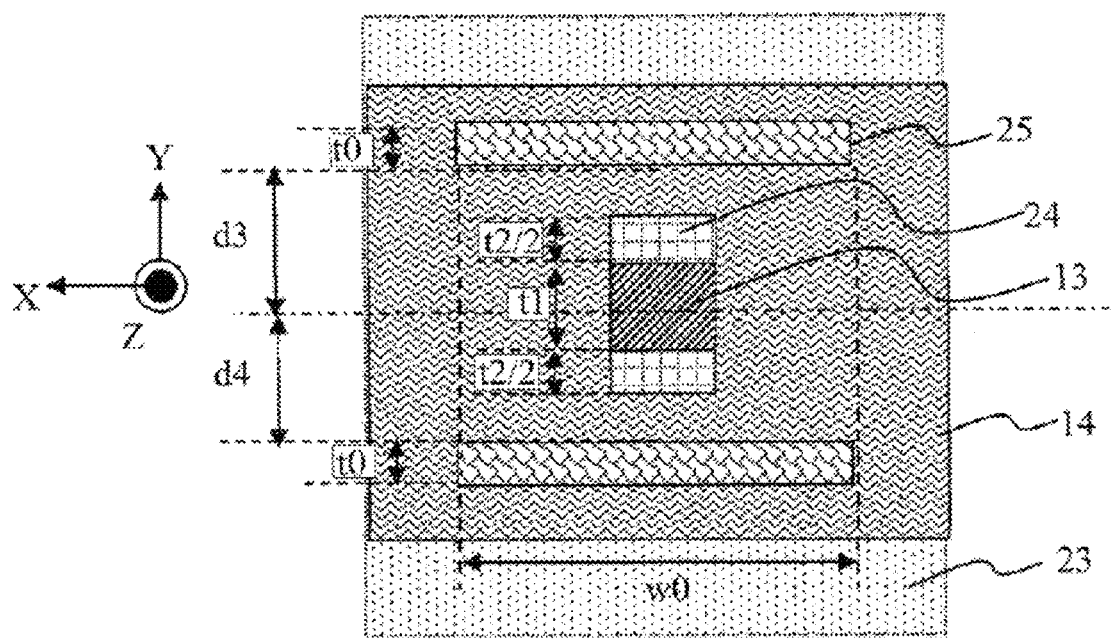
FIG. 22 shows an example when a pair of thin cores sandwiches the spot size converter.

Referring now to FIG. 22, at least two thin cores 25 may each extend from a side of the head opposite the air bearing surface toward the air bearing surface as shown. According to various approaches, a magnetic recording head may include from about three thin cores to about six thin cores, but may include more or less based on the desired embodiment.

As depicted in FIG. 22, the thin cores may sandwich the spot size converter therebetween. Moreover, the thin cores may be separated from the spot size converter by portions of the waveguide. In addition, the thin cores may each have a width greater than a maximum width of the spot size converter.

According to one approach, at least one cover layer may be incorporated between one or more of the thin cores and the spot size converter. In another approach, the at least one cover layer may preferably have a lower refractive index than the spot size converter, the thin cores, and/or the waveguide.

According to one approach, a rectangular portion and/or a tapered portion (hereinafter, the primary core) may form the cover layer 15. In this case, the light coupled and propagated in each thin core 25 may couple in the tapered portion; therefore, the light utilization efficiency of the spot size converter may be improved.

Figure 23A:
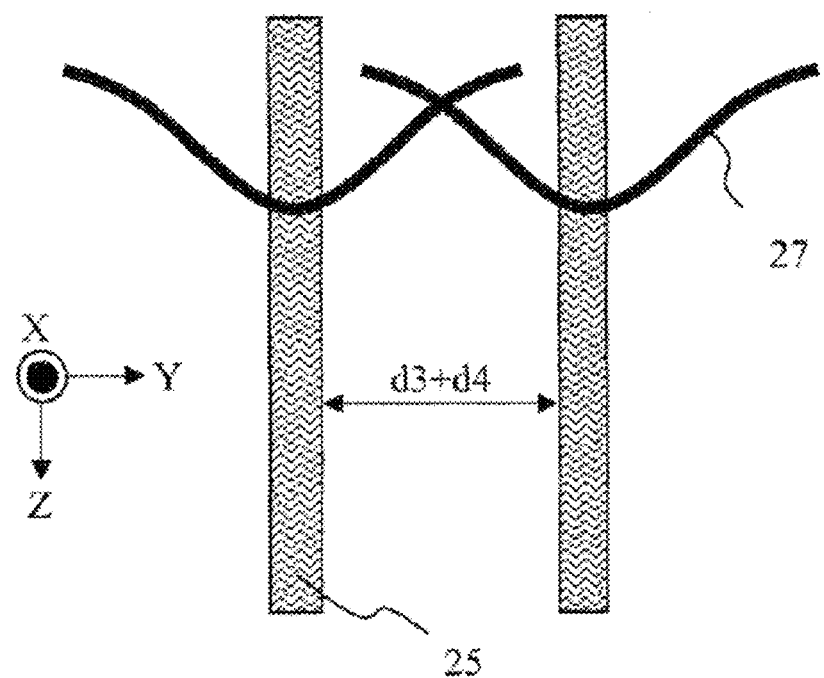
FIG. 23A is a conceptual view for explaining the light propagated by the two thin cores, showing the case of a long distance between the thin cores.

This principle is simply explained with reference to FIGS. 23A-24B. FIG. 23A is a cross-sectional view of only two thin cores viewed from the YZ plane, and provides a schematic view for explaining the intensity profile (e.g., light spot) of the light propagated by two thin cores 25 having the same shape. According to one approach, when the light is incident on the two thin cores 25, the light spot 27 shown in the drawing is propagated along the respective thin core 25.

Figure 23B:
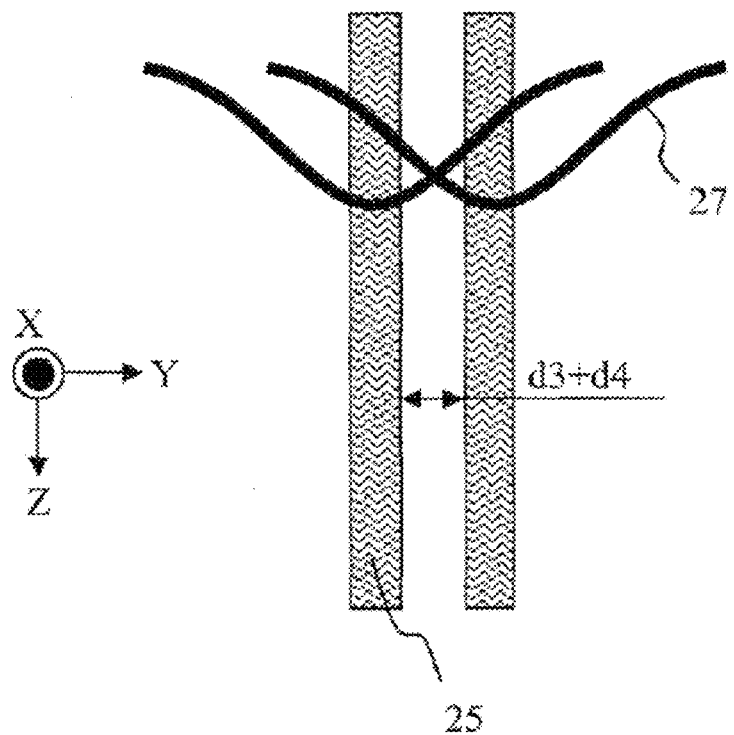
FIG. 23B is a conceptual view for explaining the light propagated by the two thin cores, showing the case of a short distance between the thin cores.

As shown in FIG. 23B, when the interval d1+d2 between the cores is small, the light spot 27 pair overlap and have nearly the same intensity distribution as one light spot. Therefore, the coupling efficiency of the two thin cores 25 and the incident light becomes nearly the same as that with one thin core. However, if the interval d3+d4 increases as shown in FIG. 23A, such that the distance between the two is sufficiently large, light is equally propagated to each of the two thin cores. Therefore, the coupling efficiency can be approximately twice that when the interval d3+d4 is small.

According to another approach, as the interval d3+d4 increases, the coupling efficiency of the light propagated by two thin-film cores and the primary core decreases due to a mismatch in the intensity profiles of the light propagated by the two thin-film cores and the light propagated by the primary core increases.

Figure 24A:
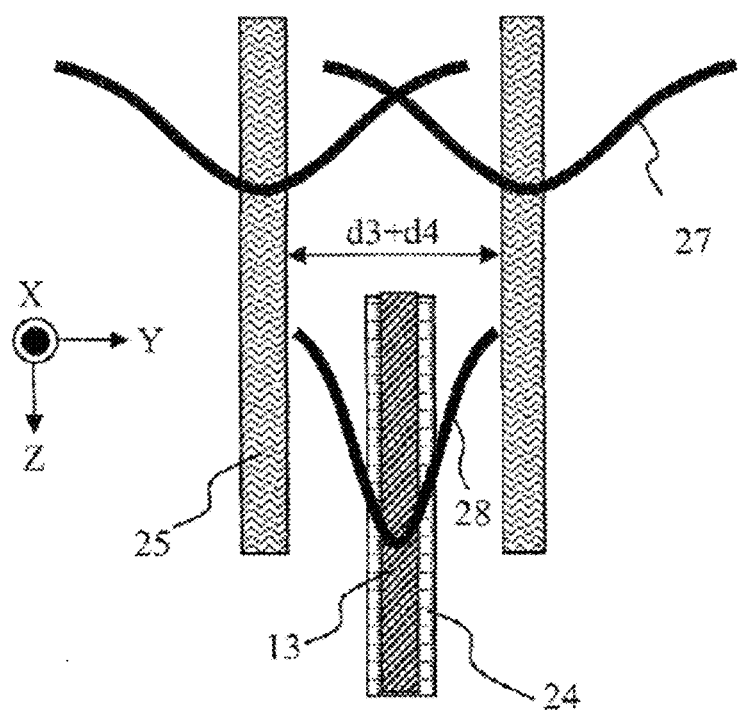
FIG. 24A is a conceptual view for explaining the light coupling between the two thin cores and the spot size converter, showing the case of a long distance between the thin cores.
Figure 24B:
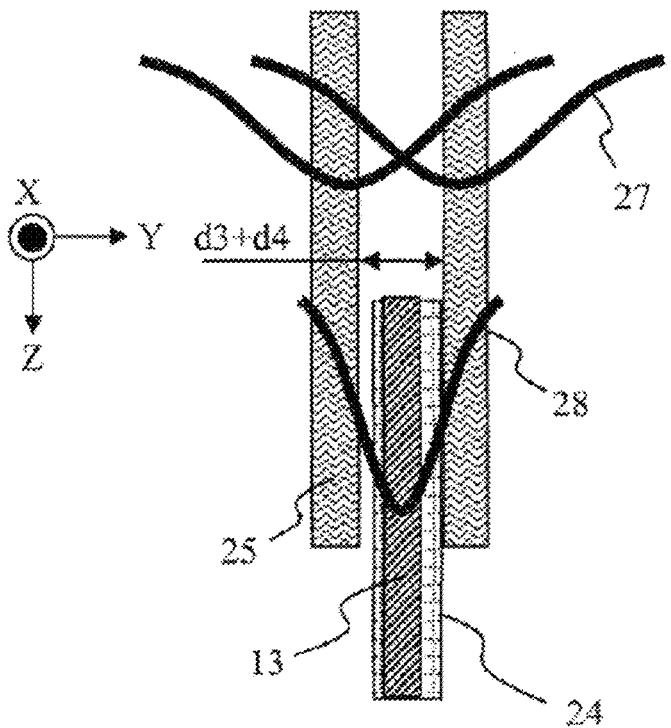
FIG. 24B is a conceptual view for explaining the light coupling between the two thin cores and the spot size converter, showing the case of a short distance between the thin cores.

FIGS. 24A-24B are cross-sectional views of the spot size converter 13 seen from the YZ plane and schematically shows the light spot 28 of light propagated in the thin-film core 25 as well as the light propagated in the upper part of the primary core. When the interval d1+d2 is small in both cores as shown in FIG. 24B, the light couples highly efficiently to the primary core because the intensity profiles of the light 27 propagated by the two thin-film cores, and the light 28 propagated by the upper part of the primary core member are close. However, when the interval d3+d4 of both cores is large as shown in FIG. 24A, the coupling efficiency decreases because the difference in the intensity profile is large.

According to one embodiment, desirable effects may be obtained by forming a thin-film core. In a preferred approach, the thin-film core may include the core and the cladding instead of the rectangular portion. In a preferred approach, the effect of flattening the light wavefront may correspond with having a core width or thickness equal to or above the width or thickness (Ww) obtained with the penetration mode.

According to another approach, to further improve the light utilization efficiency of the spot size converter, the rectangular portion and/or the tapered portion may be formed to be sandwiched by at least two thin cores. Thus, the light utilization efficiency of the spot size converter may be improved because the light coupled and propagated in each thin core may be coupled to the tapered portion.

Figure 25:
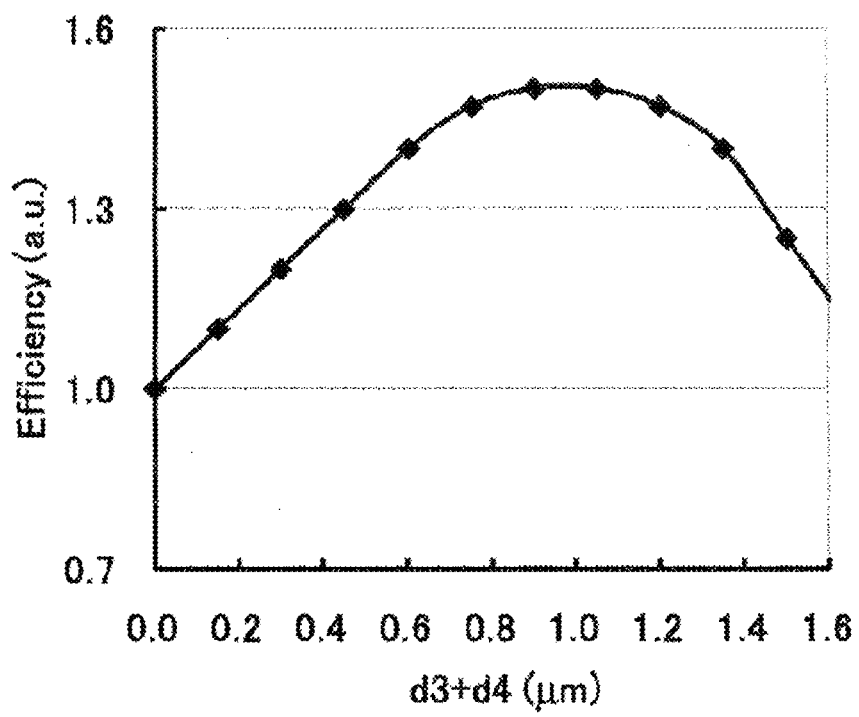
FIG. 25 shows the relationship between the distance between the thin cores and the light utilization efficiency in the spot size converter in FIG. 18.

Therefore, in order to obtain the maximum light utilization efficiency, the BPM method may be incorporated to calculate the relationship between the interval d3+d4 and the light utilization efficiency of the spot size converter 13 using two thin cores 25 and the primary core. FIG. 25 depicts the calculation result according to an illustrative example. As shown, the light utilization efficiency of the vertical axis is normalized so that the utilization efficiency is 1 when there is only one thin core 25. When the interval d3+d4 is from about 1.2 to about 1.8 μm, the light utilization efficiency was at least 1.3 times that when one thin core was used. Moreover, the half width of the spot size in the Y direction of the light propagated along the thin core is approximately 1.5 μm.

Consequently, d3 (=d4) is a value of approximately ±20% of half of the spot size half width in the Y direction of the light propagated along the thin core 25. Thus, the distance d3 (=d4) of the primary core and the thin core 25 may be a value of about ±20% of half the spot size half width in the Y direction of the light propagated along the thin core 25 (e.g., from about 80% to about 120%). Consequently, the interval d3+d4 is set within the range of about 1.5 μm to about 1.7 μm in this embodiment. According to one approach, the half width of the spot size in the Y direction of the light propagated in the periphery of the thin core may be derived by using the BPM method if the width and the thickness of the thin core and $\Delta n$ are known.

In the above embodiments, the two thin cores 25 may preferably be essentially the same object, but the width and thickness of each thin core and $\Delta n$ may be different. In this case, d3 and d4 may be about ±20% of the spot size half width in the Y direction of the light propagated along each thin core.

Figure 26:
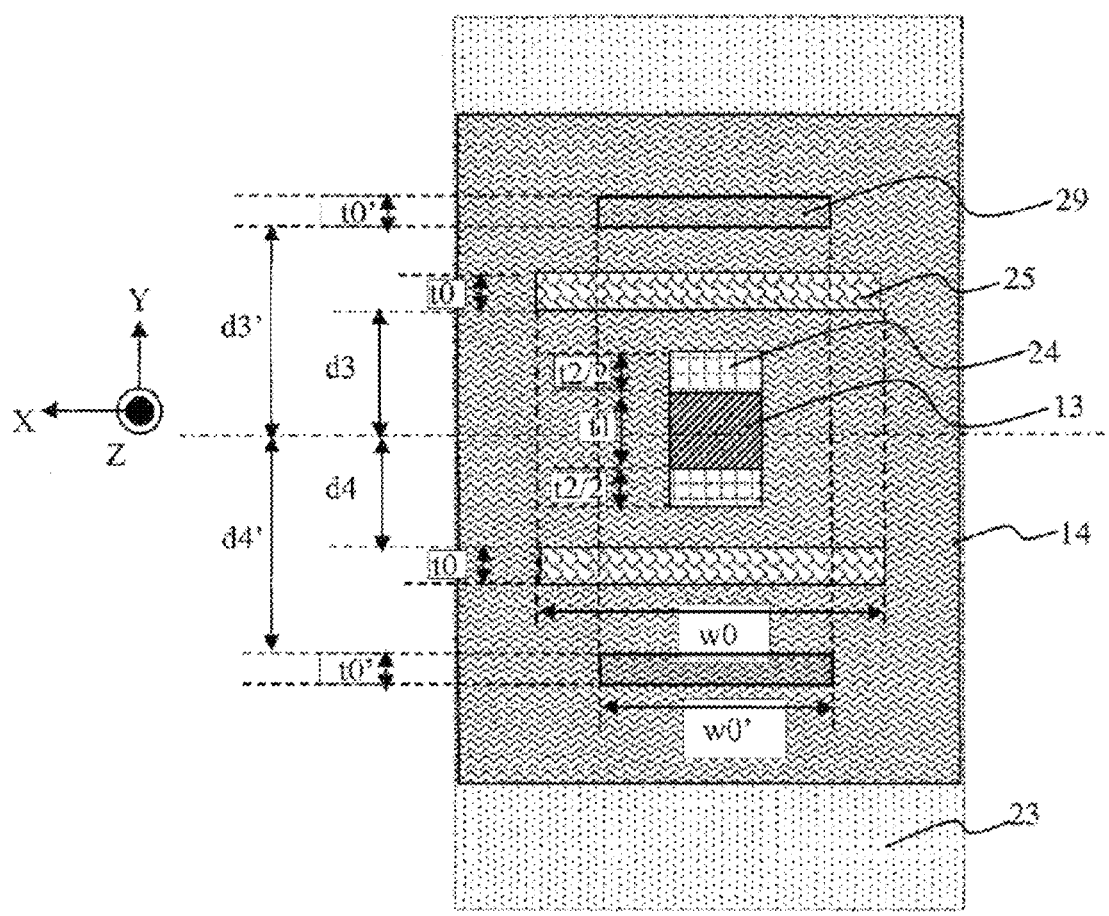
FIG. 26 shows the example of a spot size converter having at least two multimode thin film cores.

Moreover, in the above embodiments, the thin core preferably includes two layers, but as shown in FIG. 26 viewed in conjunction with FIG. 7, there may be three or more layers. Even if the spot size of the incident light 9 is larger, the thin core 25 on the outside may couple with the incident light. As a result, the light utilization efficiency of the spot size converter 13 can be improved. The distance d3' (=d4') from the center of the spot size converter 13 to the thin core 29 on the outside may be within about ±20% of the spot size half width value in the Y direction of the light propagated along the thin core 29 on the outside. According to some approaches, this value may be similar to the distance d3 (=d4) from the center of the spot size converter 13 to the thin core 25.

In addition, according to one approach, the width and/or thickness of the thin core 29 on the outside may be less than those of the multimode thin core 25 on the inside. Furthermore, the refractive index of the thin core 29 on the outside may be less than that of the thin core 25 on the inside. According to a preferred approach, when the thin core has a small width and/or thickness, or the refractive index is small, the effective refractive index of the light guide path forming the thin film core may be decreased. Because light advances to the high refractive index side as a basic property, the light coupled to the thin core 29 on the outside effectively having a low refractive index, easily couples to the thin core 25 or the spot size converter 13 on the inside. Thus the thin core 29 effectively has a higher refractive index than the thin core 29 on the outside. As a result, the light utilization efficiency of the spot size converter 13 can be improved.

Figure 27:
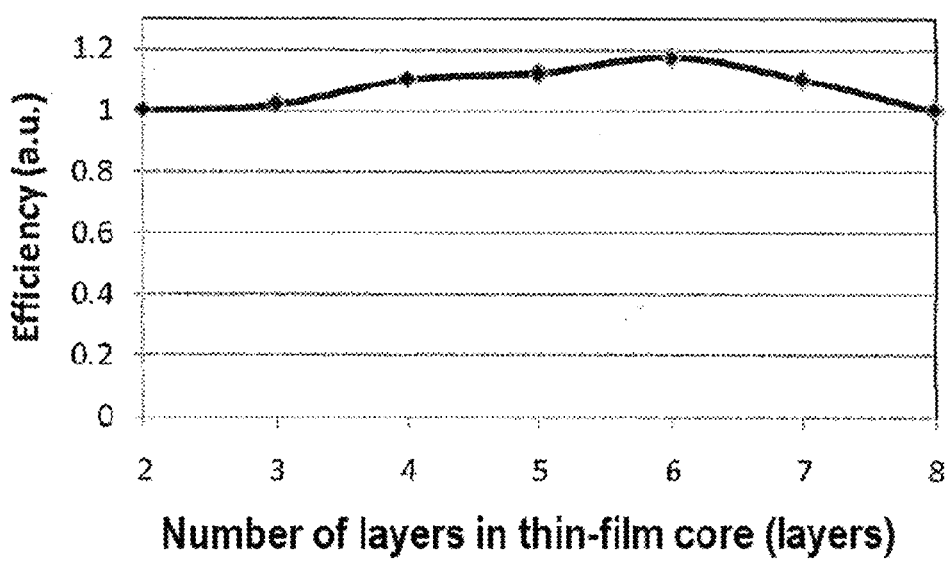
FIG. 27 shows the relationship between the number of thin cores and the light utilization efficiency in a spot size converter according to one embodiment.

Referring now to FIG. 27 the result of using the BPM method to calculate the dependence of the light utilization efficiency of the spot size converter on the number of thin cores is shown. According to one approach, the light utilization efficiency may be normalized by the efficiency when there are two thin cores. Moreover, the distance from the center of the spot size converter 13 to the thin core on the outside may preferably be within about ±20% of the spot size half width value in the Y direction of the light propagated along the thin core on the outside. As a result, the width or the thickness of the thin-film core on the outside becomes less than the width or thickness of the thin core on the inside. Conversely, it is seen in FIG. 27 that when there are at least seven thin cores, the light utilization efficiency decreases. Thus, the number of thin cores is preferably six or fewer.

The present invention is not limited to the embodiments described above and includes various modified examples. For example, the embodiments described above are described in detail in order to provide an easy to understand explanation of the present invention and are not necessarily limited to ones providing all of the structures explained. A portion of the structure of some embodiment can be replaced by the structure of another embodiment. The structure of another embodiment can be added to some other embodiment structure. A portion of the structure of each embodiment can add, delete, or replace another structure.

It should be noted that methodology presented herein for at least some of the various embodiments may be implemented, in whole or in part, in computer hardware, software, by hand, using specialty equipment, etc. and combinations thereof.

The embodiments described and/or suggested herein disclose preferred embodiments of heat-assisted recording magnetic heads capable of irradiating light, having a reduced spot size on the order of submicrons. Moreover, the embodiments described and/or suggested herein preferably enable high light utilization efficiency on the magnetic recording medium, and can implement a magnetic recording device having a large capacity and a high recording density.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording head, comprising:
a spot size converter having a tapered portion, the tapered portion having at least one of a width and thickness that increases in a direction towards an air bearing surface;
a waveguide surrounding the spot size converter, the waveguide having a refractive index that is lower than a refractive index of the spot size converter; and
cladding adjacent the waveguide, the cladding having a refractive index that is lower than the refractive index of the waveguide,
wherein a thickness of the waveguide is 40 to 120% of a diameter of a spot size of light incident on the waveguide.

2. A magnetic recording head, comprising:
a spot size converter having a tapered portion, the tapered portion having at least one of a width and thickness that increases in a direction towards an air bearing surface;
a waveguide surrounding the spot size converter, the waveguide having a refractive index that is lower than a refractive index of the spot size converter; and
cladding adjacent the waveguide, the cladding having a refractive index that is lower than the refractive index of the waveguide,
wherein a lower part of the spot size converter positioned between the tapered portion and the air bearing surface has about a constant width therealong.

3. A magnetic recording head, comprising:
a spot size converter having a tapered portion, the tapered portion having at least one of a width and thickness that increases in a direction towards an air bearing surface;
a waveguide surrounding the spot size converter, the waveguide having a refractive index that is lower than a refractive index of the spot size converter; and
cladding adjacent the waveguide, the cladding having a refractive index that is lower than the refractive index of the waveguide,
wherein a portion of the spot size converter positioned between the tapered portion and an end of the head opposite the air bearing surface has about a constant width therealong.

4. A magnetic recording head, comprising:
a spot size converter having a tapered portion, the tapered portion having at least one of a width and thickness that increases in a direction towards an air bearing surface;
a waveguide surrounding the spot size converter, the waveguide having a refractive index that is lower than a refractive index of the spot size converter; and
cladding adjacent the waveguide, the cladding having a refractive index that is lower than the refractive index of the waveguide,
wherein the at least one of the width and thickness of the tapered portion of the spot size converter transitions from below a width and/or thickness producing a penetration mode to above the width and/or thickness producing the penetration mode in the direction towards the air bearing surface.

5. A magnetic recording head, comprising:
a spot size converter having a tapered portion, the tapered portion having at least one of a width and thickness that increases in a direction towards an air bearing surface;
a waveguide surrounding the spot size converter, the waveguide having a refractive index that is lower than a refractive index of the spot size converter; and
cladding adjacent the waveguide, the cladding having a refractive index that is lower than the refractive index of the waveguide,
further comprising at least one cover layer between the waveguide and the spot size converter, wherein the at least one cover layer has a lower refractive index than the spot size converter and the waveguide.

6. The magnetic recording head according to claim 5, wherein the at least one cover layer includes a cover layer above the spot size converter.

7. The magnetic recording head according to claim 5, wherein the at least one cover layer includes a cover layer below the spot size converter.

8. The magnetic recording head according to claim 5, wherein the at least one cover layer surrounds the spot size converter.

9. The magnetic recording head according to claim 5, wherein the at least one cover layer includes a cover layer adjacent the spot size converter in a width direction.

10. A magnetic recording head, comprising:
a spot size converter having a tapered portion, the tapered portion having at least one of a width and thickness that increases in a direction towards an air bearing surface;
a waveguide surrounding the spot size converter, the waveguide having a refractive index that is lower than a refractive index of the spot size converter;
cladding adjacent the waveguide, the cladding having a refractive index that is lower than the refractive index of the waveguide; and
at least one core on a side of the spot size converter and separated therefrom by a portion of the waveguide.

11. The magnetic recording head according to claim 10, further comprising at least one cover layer between the waveguide and the at least one core, wherein the at least one cover layer has a lower refractive index than the at least one core and the waveguide.

12. A magnetic recording head, comprising:
a spot size converter having a tapered portion, the tapered portion having at least one of a width and thickness that increases in a direction towards an air bearing surface;
a waveguide surrounding the spot size converter, the waveguide having a refractive index that is lower than a refractive index of the spot size converter;
cladding adjacent the waveguide, the cladding having a refractive index that is lower than the refractive index of the waveguide; and
a thin core extending from a side of the head opposite the air bearing surface toward the air bearing surface, the thin core being separated from the spot size converter by a portion of the waveguide, the thin core having a width greater than a maximum width of the spot size converter.

13. The magnetic recording head according to claim 12, wherein the thin core does not extend to the air bearing surface, wherein the spot size converter does not extend to the end of the head opposite the air bearing surface.

14. The magnetic recording head according to claim 12, wherein the thin core does not extend to the air bearing surface, wherein the spot size converter extends to the end of the head opposite the air bearing surface.

15. A magnetic recording head, comprising:
a spot size converter having a tapered portion, the tapered portion having at least one of a width and thickness that increases in a direction towards an air bearing surface;

a waveguide surrounding the spot size converter, the waveguide having a refractive index that is lower than a refractive index of the spot size converter;

cladding adjacent the waveguide, the cladding having a refractive index that is lower than the refractive index of the waveguide; and at least two thin cores each extending from a side of the head opposite the air bearing surface toward the air bearing surface, the thin cores sandwiching the spot size converter therebetween, the thin cores being separated from the spot size converter by portions of the waveguide, the thin cores each having a width greater than a maximum width of the spot size converter.

16. The magnetic recording head according to claim 15, further comprising at least one cover layer between one or more of the thin cores and the spot size converter, wherein the at least one cover layer has a lower refractive index than the spot size converter and the thin cores.

17. The magnetic recording head according to claim 15, wherein three to six thin cores are present.

18. A magnetic data storage system, comprising:

at least one magnetic recording head as recited in claim 1;

a magnetic medium;

a drive mechanism for passing the magnetic medium over the at least one magnetic head; and a controller electrically coupled to the at least one magnetic head for controlling operation of the at least one magnetic head.

\* \* \* \* \*

UNITED STATES PATENT AND TRADEMARK OFFICE
CERTIFICATE OF CORRECTION

PATENT NO. : 8,619,511 B1
APPLICATION NO. : 13/568001
DATED : December 31, 2013
INVENTOR(S) : Yasuhiko Iwanabe Page 1 of 1

It is certified that error appears in the above-identified patent and that said Letters Patent is hereby corrected as shown below:

In the specification:

col. 16, line 28 replace formula (5) with $n_1 \cdot t_1 + n_3 \cdot A = n_2 \cdot (t_1 + A)$ Signed and Sealed this
First Day of April, 2014

Michelle K. Lee
*Deputy Director of the United States Patent and Trademark Office*